United States Patent [19]

Chow et al.

[11] Patent Number: 5,495,471
[45] Date of Patent: Feb. 27, 1996

[54] SYSTEM AND METHOD FOR RESTORING A TELECOMMUNICATIONS NETWORK BASED ON A TWO PRONG APPROACH

[75] Inventors: Ching-Hua Chow; Sami A. Syed; John D. Bicknell; Stephen C. McCaughey, all of Colorado Springs, Colo.

[73] Assignee: MCI Communications Corporation, Washington, D.C.

[21] Appl. No.: 207,638

[22] Filed: Mar. 9, 1994

[51] Int. Cl.⁶ .............................. H04L 12/24; G06F 11/20
[52] U.S. Cl. .............................. 370/16; 370/54; 371/20.1; 340/827
[58] Field of Search ................................ 370/16, 16.1, 54; 371/7, 8.1, 8.2, 11.1, 11.2; 379/26, 221, 273; 340/825.01, 827, 825.54; 455/8

[56] References Cited

U.S. PATENT DOCUMENTS

| | | | |
|---|---|---|---|
| 4,598,400 | 7/1986 | Hillis | 370/60 |
| 4,999,829 | 3/1991 | Fite, Jr. et al. | 370/16 |
| 5,058,105 | 10/1991 | Mansour et al. | 370/16 |
| 5,093,824 | 3/1992 | Coan et al. | 370/16 |
| 5,113,398 | 5/1992 | Howes | 371/11.2 |
| 5,117,422 | 5/1992 | Hauptschein et al. | 370/95.1 |
| 5,130,974 | 7/1992 | Kawamura et al. | 370/16 |
| 5,146,452 | 9/1992 | Pekarske | 370/16 |
| 5,173,689 | 12/1992 | Kusano | 340/827 |
| 5,218,601 | 6/1993 | Chujo et al. | 370/16 |
| 5,235,599 | 8/1993 | Nishimura et al. | 370/16 |
| 5,260,945 | 11/1993 | Rodeheffer | 371/8.2 |
| 5,293,376 | 3/1994 | White | 370/54 |
| 5,319,632 | 6/1994 | Iwasaki | 370/16 |
| 5,347,271 | 9/1994 | Iwasaki | 340/827 |
| 5,386,414 | 1/1995 | Chou et al. | 370/60 |

OTHER PUBLICATIONS

"A Fast Distributed Restoration Technique For Networks Using Digital Crossconnect Machines", E. D. Grover, IEEE, May 1987.

"Fitness Failure Immunization Technology for Network Service Survivability", C. Han Yang et al., *IEEE*, Mar. 1988, pp. 1549–1554.

"A New Approach to the Maximum–Flow Problem", Andrew V. Goldberg et al., *Journal of the Association for Computing Machinery*, vol. 35, No. 4, Oct. 1988, pp. 921–940.

"A Distributed Link Restoration Algorithm With Robust Preplanning", Joseph E. Baker, Globecom '91, *IEEE*, 1991, pp. 306–311.

"Using Distributed Topology Update and Preplanned Configurations to Achieve Trunk Network Survivability", Brian A. Coan et al., *IEEE Transactions on Reliability*, vol. 40, No. 4, Oct. 1991.

"RREACT: A Distributed Protocol for Rapid Restoration of Active Communication Trunks", E. Edward Chow et al., MCCS Technical Report EAS–CS–92–18, Nov. 1992.

*Primary Examiner*—Hassan Kizou
*Attorney, Agent, or Firm*—Pollock, Vande Sande & Priddy

[57] ABSTRACT

A fast distributed network restoration system and method therefor for restoring disrupted traffic, due to a cut link, in a digital cross-connect system (DCS) network utilizes a two-prong approach whereby both disrupted ends of the cut link simultaneously send out restore messages. To this end, upon detection of a cut link, the end nodes are respectively designated as a Gray Origin node and a Black Origin node. The Gray Origin node begins to broadcast Gray restoration request messages while the Black Origin node begins to broadcast Black restoration request messages to their respective neighbor nodes. As soon as an intermediate node receives one of the restoration request messages, depending on the color attribute of the message, that intermediate node is identified as either a Gray or Black node. Once a network node has received both Gray and Black restoration request messages, a restoration path is identified and that node begins to connect the spare channels of the links over which the request messages arrived. A system for effecting the method of the present invention is also disclosed.

24 Claims, 17 Drawing Sheets

FIG. 6

| State \ Msg Type | Link Break | Black | Gray | Backtrack Black | Backtrack Gray | Cancel |
|---|---|---|---|---|---|---|
| White | Go to Gray-State and Flood Gray Messages -or- Go to Black-Origin State and Flood Black Message | Go to Black State Make table record and propagate the Black Message | Go to Gray State Make table record and propagate the Gray Message | Ignore | Ignore | Disconnect redundant connections and selectively propagate the Cancel Message |
| Black | N/A | Update table record and propagate the Black Message | Connect and forward according to the Black message table record—send Backtrack Gray Message for unconnected requested bandwidth | Disconnect and redirect, if redirect is not possible, send Backtrack Black Message to the next Black node | Disconnect and redirect as if receiving a Gray message, if redirect is not possible send Backtrack Gray Message | Disconnect redundant connections, propagate the Cancel Message and go to White State |
| Gray | N/A | Connect and forward according to the Gray message table record-send Backtrack Black Message for unconnected requested bandwidth | Update table record and propagate the Gray Message | Disconnect and redirect as if receiving a Black message, if redirect is not possible send Backtrack Black Message | Disconnect and redirect, if redirect is not possible, send Backtrack Gray Message to the next Gray node | Disconnect redundant connections, propagate the Cancel Message and go to White State |
| Black-Origin | N/A | Ignore | Initiate in-band ack signal-connect upon receipt of in-band confirm msg. If 100% restoration has been achieved, flood cancel msgs, goto White state | Disconnect redundant connections | Ignore | Ignore |
| Gray-Origin | N/A | Initiate 'listening' for ack signal(in-band)— Make connection and send in-band confirm msg | Ignore | Ignore | Ignore | Disconnect redundant connections and go to White State |

FIG. 15a

| Scenario | Perf. Metric | Two Prong | FITNESS | RREACT |
|---|---|---|---|---|
| New Jersey Single Link Failure N01-N02 74 ch. lost | Time msec Level Spares Used # of Msgs (# of Paths) | 482 100% 318 126 7 | 1096 100% 343 136 3 | 582 100% 252 78 4 |
| New Jersey Single Link Failure N01-N03 71 ch. lost | Time msec Level Spares Used # of Msgs (# of Paths) | 120 100% 160 106 2 | 654 100% 160 64 2 | 195 100% 160 73 2 |
| New Jersey Single Link Failure N01-N05 53 ch. lost | Time msec Level Spares Used # of Msgs (# of Paths) | 138 100% 116 95 3 | 645 100% 157 61 2 | 214 100% 116 63 3 |
| New Jersey Single Link Failure N02-N03 53 ch. lost | Time msec Level Spares Used # of Msgs (# of Paths) | 321 100% 186 97 3 | 724 100% 261 101 2 | 741 100% 189 149 4 |
| New Jersey Single Link Failure N03-N05 16 ch. lost | Time msec Level Spares Used # of Msgs (# of Paths) | 107 100% 48 89 1 | 343 100% 48 30 1 | 207 100% 48 107 1 |
| New Jersey Single Link Failure N04-N08 59 ch. lost | Time msec Level Spares Used # of Msgs (# of Paths) | 595 100% 222 157 7 | 1127 100% 278 112 3 | 594 100% 222 108 6 |

FIG. 15b

| Scenario | Perf. Metric | Two Prong | FITNESS | RREACT |
|---|---|---|---|---|
| New Jersey Single Link Failure N05-N08 81 ch. lost | Time msec Level Spares Used # of Msgs (# of Paths) | 273 100% 210 144 7 | 1756 100% 289 200 5 | 402 100% 204 79 6 |
| New Jersey Single Link Failure N06-N08 47 ch. lost | Time msec Level Spares Used # of Msgs (# of Paths) | 146 100% 141 127 3 | 1004 100% 141 101 3 | 301 100% 141 94 3 |
| New Jersey Single Link Failure N07-N08 41 ch. lost | Time msec Level Spares Used # of Msgs (# of Paths) | 140 100% 123 102 2 | 672 100% 123 86 2 | 228 100% 123 68 2 |
| New Jersey Single Link Failure N08-N11 64 ch. lost | Time msec Level Spares Used # of Msgs (# of Paths) | 475 100% 215 133 5 | 1827 100% 239 197 5 | 739 100% 233 114 6 |
| New Jersey Single Link Failure N09-N11 65 ch. lost | Time msec Level Spares Used # of Msgs (# of Paths) | 141 100% 189 99 3 | 748 100% 254 88 2 | 592 100% 189 90 4 |

FIG. 16a

| Scenario | Perf. Metric | Two Prong | FITNESS | RREACT | SHN |
|---|---|---|---|---|---|
| LATA 'X'<br>Single Link<br>Failure<br>N01-N02<br>20 ch. lost | Time msec<br>Level<br>Spares Used<br># of Msgs<br>(# of Paths) | 96<br>28%<br>10<br>100<br>1 | 312<br>28%<br>10<br>145<br>1 | 133<br>28%<br>10<br>617<br>1 | 167<br>28%<br>10<br>Not Avail.<br>1 |
| LATA 'X'<br>Single Link<br>Failure<br>N01-N03<br>18 ch. lost | Time msec<br>Level<br>Spares Used<br># of Msgs<br>(# of Paths) | 159<br>39%<br>14<br>142<br>2 | 624<br>39%<br>14<br>74<br>2 | 319<br>39%<br>14<br>556<br>2 | 144<br>39%<br>14<br>Not Avail.<br>2 |
| LATA 'X'<br>Single Link<br>Failure<br>N01-N05<br>13 ch. lost | Time msec<br>Level<br>Spares Used<br># of Msgs<br>(# of Paths) | 220<br>100%<br>29<br>111<br>4 | 975<br>100%<br>40<br>114<br>3 | 322<br>100%<br>29<br>103<br>4 | 254<br>100%<br>29<br>Not Avail.<br>4 |
| LATA 'X'<br>Single Link<br>Failure<br>N02-N03<br>13 ch. lost | Time msec<br>Level<br>Spares Used<br># of Msgs<br>(# of Paths) | 117<br>38%<br>10<br>119<br>1 | 312<br>38%<br>10<br>840<br>1 | 120<br>38%<br>10<br>580<br>1 | 177<br>38%<br>10<br>Not Avail.<br>1 |
| LATA 'X'<br>Single Link<br>Failure<br>N04-N05<br>17 ch. lost | Time msec<br>Level<br>Spares Used<br># of Msgs<br>(# of Paths) | 180<br>100%<br>36<br>139<br>4 | 1297<br>100%<br>42<br>124<br>4 | 263<br>100%<br>36<br>108<br>4 | 294<br>100%<br>43<br>Not Avail.<br>4 |
| LATA 'X'<br>Single Link<br>Failure<br>N04-N08<br>15 ch. lost | Time msec<br>Level<br>Spares Used<br># of Msgs<br>(# of Paths) | 135<br>100%<br>34<br>109<br>3 | 986<br>100%<br>38<br>155<br>3 | 496<br>100%<br>34<br>185<br>3 | 352<br>100%<br>38<br>Not Avail.<br>3 |

FIG. 16b

| Scenario | Perf. Metric | Two Prong | FITNESS | RREACT | SHN |
|---|---|---|---|---|---|
| LATA 'X'<br>Single Link<br>Failure<br>N05-N08<br>20 ch. lost | Time msec<br>Level<br>Spares Used<br># of Msgs<br>(# of Paths) | 198<br>100%<br>40<br>137<br>5 | 1244<br>100%<br>40<br>156<br>4 | 290<br>100%<br>40<br>125<br>5 | 259<br>100%<br>40<br>Not Avail<br>5 |
| LATA 'X'<br>Single Link<br>Failure<br>N06-N08<br>12 ch. lost | Time msec<br>Level<br>Spares Used<br># of Msgs<br>(# of Paths) | 330<br>92%<br>28<br>149<br>4 | 674<br>92%<br>33<br>135<br>2 | 434<br>92%<br>27<br>253<br>3 | 365<br>92%<br>28<br>Not Avail<br>4 |
| LATA 'X'<br>Single Link<br>Failure<br>N07-N08<br>10 ch. lost | Time msec<br>Level<br>Spares Used<br># of Msgs<br>(# of Paths) | 103<br>20%<br>4<br>149<br>1 | 328<br>20%<br>4<br>134<br>1 | 159<br>20%<br>4<br>127<br>1 | 189<br>20%<br>6<br>Not Avail<br>1 |
| LATA 'X'<br>Single Link<br>Failure<br>N08-N11<br>16 ch. lost | Time msec<br>Level<br>Spares Used<br># of Msgs<br>(# of Paths) | 220<br>100%<br>37<br>154<br>4 | 1315<br>100%<br>37<br>173<br>4 | 938<br>100%<br>37<br>367<br>4 | 465<br>100%<br>41<br>Not Avail<br>6 |
| LATA 'X'<br>Single Link<br>Failure<br>N09-N11<br>16 ch. lost | Time msec<br>Level<br>Spares Used<br># of Msgs<br>(# of Paths) | 179<br>100%<br>33<br>125<br>4 | 1277<br>100%<br>33<br>154<br>4 | 569<br>100%<br>33<br>466<br>4 | 288<br>100%<br>33<br>Not Avail<br>4 |

FIG. 17a

| Scenario | Perf. Metric | Two Prong | FITNESS | RREACT | SHN |
|---|---|---|---|---|---|
| US Net<br>Single Link<br>Failure<br>N05-N06<br>100 ch. lost | Time msec<br>Level<br>Spares Used<br># of Msgs<br>(# of Paths) | 597<br>6%<br>33<br>350<br>5 | 1857<br>6%<br>33<br>357<br>4 | 1375<br>6%<br>33<br>838<br>4 | 320<br>6%<br>33<br>Not Avail<br>4 |
| US Net<br>Single Link<br>Failure<br>N07-N11<br>100 ch. lost | Time msec<br>Level<br>Spares Used<br># of Msgs<br>(# of Paths) | 772<br>10%<br>52<br>686<br>8 | 1884<br>9%<br>--<br>--<br>-- | 1254<br>10%<br>49<br>1070<br>6 | 878<br>10%<br>69<br>Not Avail<br>7 |
| US Net<br>Single Link<br>Failure<br>N08-N09<br>100 ch. lost | Time msec<br>Level<br>Spares Used<br># of Msgs<br>(# of Paths) | 453<br>2%<br>12<br>388<br>2 | 1121<br>2%<br>11<br>373<br>2 | 999<br>2%<br>11<br>1069<br>2 | 325<br>2%<br>.11<br>Not Avail<br>2 |
| US Net<br>Single Link<br>Failure<br>N09-N10<br>100 ch. lost | Time msec<br>Level<br>Spares Used<br># of Msgs<br>(# of Paths) | 395<br>3%<br>19<br>385<br>3 | 1528<br>3%<br>18<br>478<br>3 | 928<br>3%<br>18<br>897<br>3 | 420<br>3%<br>18<br>Not Avail<br>3 |
| US Net<br>Single Link<br>Failure<br>N10-N21<br>100 ch. lost | Time msec<br>Level<br>Spares Used<br># of Msgs<br>(# of Paths) | 341<br>8%<br>33<br>286<br>4 | 1515<br>8%<br>33<br>452<br>4 | 1341<br>8%<br>33<br>1079<br>4 | 362<br>8%<br>33<br>Not Avail<br>5 |
| US Net<br>Single Link<br>Failure<br>N15-N19<br>100 ch. lost | Time msec<br>Level<br>Spares Used<br># of Msgs<br>(# of Paths) | 239<br>13%<br>35<br>562<br>5 | 1030<br>13%<br>39<br>316<br>3 | 592<br>13%<br>35<br>1052<br>4 | 215<br>13%<br>35<br>Not Avail<br>4 |

FIG. 17b

| Scenario | Perf. Metric | Two Prong | FITNESS | RREACT | SHN |
|---|---|---|---|---|---|
| US Net Single Link Failure N20-N21 100 ch. lost | Time msec Level Spares Used # of Msgs (# of Paths) | 475 11% 51 503 7 | 1809 10% -- -- -- | 1305 11% 48 1055 6 | 409 11% 48 Not Avail 6 |

SYSTEM AND METHOD FOR RESTORING A TELECOMMUNICATIONS NETWORK BASED ON A TWO PRONG APPROACH

FIELD OF THE INVENTION

This invention relates to a method and system for restoring traffic in a telecommunications network and more particularly to a fast distributed network restoration arrangement and method for restoring disrupted communications network connections after network failures. The invention is based on a two prong approach whereby aggregated bandwidth restoration requests are issued from both ends of the disrupted connection.

BACKGROUND OF THE INVENTION

With the widespread deployment of fiber optic transmission systems and the alarming rate of outages due to fiber cuts, there is great interest in improving the process of restoring disrupted traffic from minutes to sub-seconds following a fiber cut. Automatic protection switching probably is the fastest technique and can switch the disrupted traffic to dedicated spare links in under 50 milliseconds. However, it also requires high dedicated spare channel capacity. With recent advances in digital cross-connect systems (DCS), there is increasing interest in using DCS in network restoration. But the centralized DCS-based network restoration method requires reliable telemetric links between the DCS nodes and the network operation center. Moreover, it is slower than distributed DCS-based network restoration, where the affected DCS nodes exchange messages directly to restore the disrupted traffic. The hybrid preplanned approach proposed in Bellcore's NETSPAR uses a distributed topology update protocol to identify the fault and then downloads a precomputed routing table according to the fault. The problem with the NETSPAR approach is that a great amount of memory is required for storing the routing tables.

There are two basic approaches to reroute the disrupted traffic due to a fiber span cut. The link restoration approach replaces the affected link segment of a disrupted channel by a spare path between the two disrupted ends. The path restoration approach releases each disrupted channel and lets the source and destination end of the channel re-establish the connection. With the additional release phase the path restoration approach takes more time than the link restoration. However, the path restoration approach can find more efficient spare paths with fewer link segments and can handle the node failure situation with the same logic. To achieve fast network restoration, the link restoration approach is used.

Routing algorithms proposed for computer networks find the shortest paths from each node to all other nodes in a network. The approximate distributed Bellman-Ford algorithms has polynomial message complexity and very fast response time. However, the goal of routing algorithms is quite different from that of distributed network restoration, which is to find the shortest paths between two disrupted nodes. The response time requirement of the network restoration algorithm is almost two orders of magnitude of that imposed on routing algorithms.

The network restoration problem can be formulated as a maximum flow problem (See book by T. H. Cormen el. al. entitled "Introduction to Algorithms", The MIT Press, 1990; and "Distributed Link Restoration with Robust Planning" by J. E. Baker in Proceedings of GLOBACOM '91, pp. 306–311, Dec. 1991) where the goal is to find all the disjoint paths with the maximum flow between the two disrupted nodes. The efficient distributed maximum flow algorithm proposed by Goldberg and Tarjan ("A New Approach to Maximum-Flow Problem" Journal of the Association for Computing Machinery, Vol.35, No. 4, pp.921–940, Oct. 1988) requires $O(n^2)$ waves of messages and $O(n^3)$ messages, where n is the number of nodes in the network. The Goldberg el. al. algorithm, in finding the potential paths for restoration, can only be applied in small networks and is used in conjunction with a path selection algorithm to generate results as a benchmark to compare the efficiency of other network restoration algorithms.

The first distributed network restoration method for a DCS-based fiber network was proposed by W. D. Grover in "The Self-healing Network: A Fast Distributed Restoration Technique For Networks Using Digital Cross-Connect Machines", Proceedings of GLOBECOM '87, pp. 28.2.1–28.2.6, 1987 and detailed in his 1989 Ph.D. dissertation for the Department of Electrical Engineering at University of Alberta entitled, "Self Healing Networks: A Distributed Algorithm For K-Shortest Link-Disjoint Paths In A Multi-Graph With Applications In Real Time Network Restoration". The protocol associated with the algorithm is called the Self-Healing Network (SHN) protocol. In the SHN protocol, one of the two DCS nodes, on detecting the fiber cut, becomes the Sender based on some arbitration rule, such as larger DCS network ID, and the other becomes the Chooser. Then, the request messages, called signatures, are sent out along all the spare channels on all outgoing fibers. These signatures each bear different indices and are broadcasted to the intermediate nodes between the Sender and the Chooser. On receiving a signature, the Chooser checks the index. If it is the first time that the Chooser has received a signature with this index number, then a reply signature is sent back through the same request path. Upon receipt of a reply signature, each of the intermediate nodes generates a switch command to the DCS to connect the ports of the two spare channels. This is called reverse linking. When the Sender receives the reply signature, it reconnects one of the disrupted channels to the new spare path and sends the information of the restored channel ID through the spare path back to the Chooser. The Chooser, on receiving the restored channel ID information from the spare path, reconnects the corresponding ports to restore the disrupted channel. Thus, the Grover protocol basically requires three message transmissions between the Sender and the Chooser for each disrupted channel.

For SHN, that one signature is sent out for each spare channel connected to Sender and is indexed for distinction. On the same route, these signatures compete for computation resources in each DCS node for processing.

The execution steps of Grover's approach for a single channel restoration route is shown with reference to FIG. 1. As shown, at Step 1, the Sender broadcasts a signature towards the Chooser. At Steps 2 and 3, the signature is propagated along the available spare channels on other outgoing links. At Step 4, after receiving the signature, the Chooser sends a reply signature back towards the Sender. At Steps 5 and 6, on receiving the reply signature, the intermediate node makes the DCS connection and forwards the reply signature along the restoration path. At Step 7, the Sender receives the reply signature and selects one disrupted channel to connect the restoration path. A mapping information message including the ID of this disrupted channel is then sent through the connected restoration path directly to the Chooser without the need for message processing in the intermediate nodes. Finally, at Step 8, on receiving the mapping information message, the Chooser connects the restoration path to the corresponding disrupted channel to complete the restoration.

Another distributed network restoration process for DCS-based fiber networks has been proposed by Yang and Hasegawa in "FITNESS: Failure Immunization Technology for Network Survivability," Proc. of GLOBECOM '88, pp. 47.3.1–47.3.6, Nov. 1988. This method became known as Bellcore's FITNESS approach. It also uses a Sender Chooser relationship for the nodes adjacent to the cut fiber link. The FITNESS approach reduces the potentially large number of signatures that may be generated in SHN by requesting the aggregated maximum bandwidth that is allowed on a restoration route. Specifically, the restoration process is initiated by the Sender's broadcast of restoration request messages, called help messages, on all links which contain spare channels. Each help message contains the Sender address, Sender Chooser pair ID, source of the message, destination of the message, requested bandwidth and hop count. Requested bandwidth is the minimum of the working channels lost due to the fiber link cut and the spare capacity of the particular link over which the specific help message is being broadcasted.

Help messages are selectively broadcasted by intermediate nodes, each of which maintains a table of the help messages it has received. This table contains the source of the help message, requested bandwidth and hop count of the path from the Sender. The first help message received is always broadcasted. Successive help messages are broadcasted only if the requested bandwidth is greater than all previously received messages. Received help messages with a requested bandwidth that equals to earlier messages but with 1 lower hop count are not broadcasted. Instead, table hop count and source entries are modified to reflect the discovery of the shorter path. Help messages with lower bandwidth than any table entries or equal bandwidth and higher hop count are ignored. The requested bandwidth in help messages broadcasted by intermediate nodes are the minimum of the arriving messages' requested bandwidth and the spare capacity of the link over which the help message is being sent.

On detection of fiber link failure, the node which becomes the Chooser sets a fixed time-out. The length of time for time-out is determined empirically, with optimal choice being in the range of 250 to 350 msec. During time-out, the Chooser maintains a table of all received help messages. On the termination of time-out, the Chooser selects the table entry corresponding to the largest requested bandwidth and sends an acknowledgment message to the source of the selected help message.

On receipt of an acknowledgment message, each intermediate node replies with a confirmation message and then sends the acknowledgment message to the next node along the path to the Sender. As this process continues, on receipt of a confirmation message, each node makes cross connections to restore lost working channels. If a single restoration path provides insufficient bandwidth to affect full restoration of all lost working channels, the Sender initiates a new wave of help messages. This process is repeated until all channels are restored, or no new paths can be found.

FIG. 2 shows the execution steps of the FITNESS algorithm on a restoration route. Note that these steps are similar to those of SHN except that at Step 4 the Chooser makes the DCS connection according to the available bandwidth and sends the mapping information message with the IDs of the restored channels to the Sender. This allows the FITNESS approach to have one less step than SHN. The messages in the FITNESS approach are longer than those in SHN. The request message contains the maximum capacity and hop count of the restoration route being explored. The acknowledgment message in the FITNESS approach contains the mapping information of a set of restored channels instead of one in SHN. The message transmission time in the FITNESS approach therefore is longer than that of SHN but the message processing frequency in each node is greatly reduced.

RREACT is another distributed approach to network restoration and is described in detail by some of the co-inventors of the instant invention in "RREACT: A Distributed Protocol for Rapid Restoration of Active Communication Trunks", UCCS Tech Report EAS-CS-92-18, Nov. 1992. This method also uses a Sender-Chooser and flooding approach as in the FITNESS and Self-Healing approaches. What distinguishes this method from the other approaches is that the restoration request messages, called seek messages, include information about the path which each seek message has traversed from the Sender node to the Chooser node. Seek messages are propagated at each node as they arrive. As they are transmitted from node to node, the node ID's of the nodes they have visited and the number of spare channels available over each link they have traversed are added to a variable length field in the seek message format. This path information is inspected at each node as a seek message is received. If the message has visited the node before, it is discarded.

The effect of this flooding approach is that all possible paths between the Sender and Chooser nodes are discovered and information is received at the Chooser node to enable it to create a matrix describing the current topology of the network. As each seek message arrives at the Chooser node with a new path description, the matrix is updated and the path is selected, if possible, for use as the restoration path. The matrix is again updated to account for the spare channels taken to create the new restoration path.

The actual path building process of the RREACT approach is very similar to that of the Fitness approach shown in FIG. 2.

Most of the existing distributed network restoration algorithms therefore utilize a three phase restoration process. Needless to say, such three phase process requires time. Thus, in order to enhance the operational efficiency of a telecommunications network, the time required to restore a network from disrupted traffic needs to be dramatically reduced.

SUMMARY OF THE INVENTION

Unlike the conventional approaches where only one end of a disrupted connection broadcasts restoration request messages, for the present two prong network restoration invention, both end nodes of a disrupted connection simultaneously broadcast restoration request messages for finding restoration paths. One of the end nodes is arbitrarily designated the Black Origin node, while the other the Gray Origin node. The restoration request messages broadcasted by the two end nodes are distinguished by a color attribute, for example either Gray or Black—Gray when being broadcasted by the Gray Origin node and Black when being broadcasted by the Black Origin node.

Once a network node has received restoration request messages of both types, a restoration path is identified and that node begins to connect the spare channels of the two links over which the request messages arrived. This allows the connection of the restoration paths to be performed very early and in parallel, both along the same restoration path and among different restoration paths. When the Black Origin node receives a Gray message, it inserts an acknowledgment message into the channels of the new restoration path. This acknowledgment message is propagated along the restoration path to the Gray Origin node and is not processed by the intermediate nodes along the restoration path. Upon receipt of the acknowledgment message, the Gray Origin node connects as many disrupted channels as can be supported to the restoration channels. It then inserts a confirmation message to the channels of the new restoration path which also includes mapping information indicating which disrupted channels have been connected to which restoration paths. This information again traverses the network in the established restoration path in-band and does not incur any additional message processing delay on intermediate nodes. Upon receipt of this confirmation message, the Black Origin node effects connection of the disrupted channels in accordance with the mapping information provided by the Gray Origin node.

The present invention is distributed and therefore avoids the bottleneck of the centralized network restoration approaches. It moreover allows both end nodes of a disrupted link to simultaneously broadcast connection request messages and several restoration paths to be connected in parallel as opposed to the conventional sequential approach used in other distributed network restoration algorithms. Once the Gray message reaches a node that previously has received a Black message, it no longer is broadcasted. Instead, it is forwarded along the same path from which the Black message arrived. Thus, each type of restoration request message is broadcasted only half way along the path to the other disrupted end to thereby greatly reduce the message volume in the network and reduce message congestion at the two disrupted end nodes.

BRIEF DESCRIPTION OF THE FIGURES

The above-mentioned objective and advantages of the present invention will become more apparent and the invention itself will be best understood by reference to the following description of an embodiment of the invention taken in conjunction with the accompanying drawings, wherein:

FIG. 6 is a table detailing the different states and message types of the two prong algorithm of the present invention;

FIG. 15a and 15b, in combination, form a table that provides comparison of the present invention algorithm against other distributed network restoration algorithms on the "New Jersey" network;

FIGS. 16a and 16b together form a table providing comparison of the present invention algorithm against other distributed network restoration algorithms tested on a LATA 'X' network; and FIGS. 17a and 17b in combination illustrate a table that provides comparison of the present invention method with the other distributed network restoration algorithms on a 'US Net' network.

DETAILED DESCRIPTION OF THE PRESENT INVENTION

The present invention, as its names implies, is based on a two prong approach to finding network restoration paths. Unlike other distributed approaches, the present invention method is not based on a Sender-Chooser relationship in which one of the nodes adjacent the fiber link cut is selected to be the Sender, which is the only node allowed to initiate the restoration process. Instead, both of the nodes sandwiching the fiber link cut perform nearly symmetrical roles throughout the restoration process.

Figure 14A:
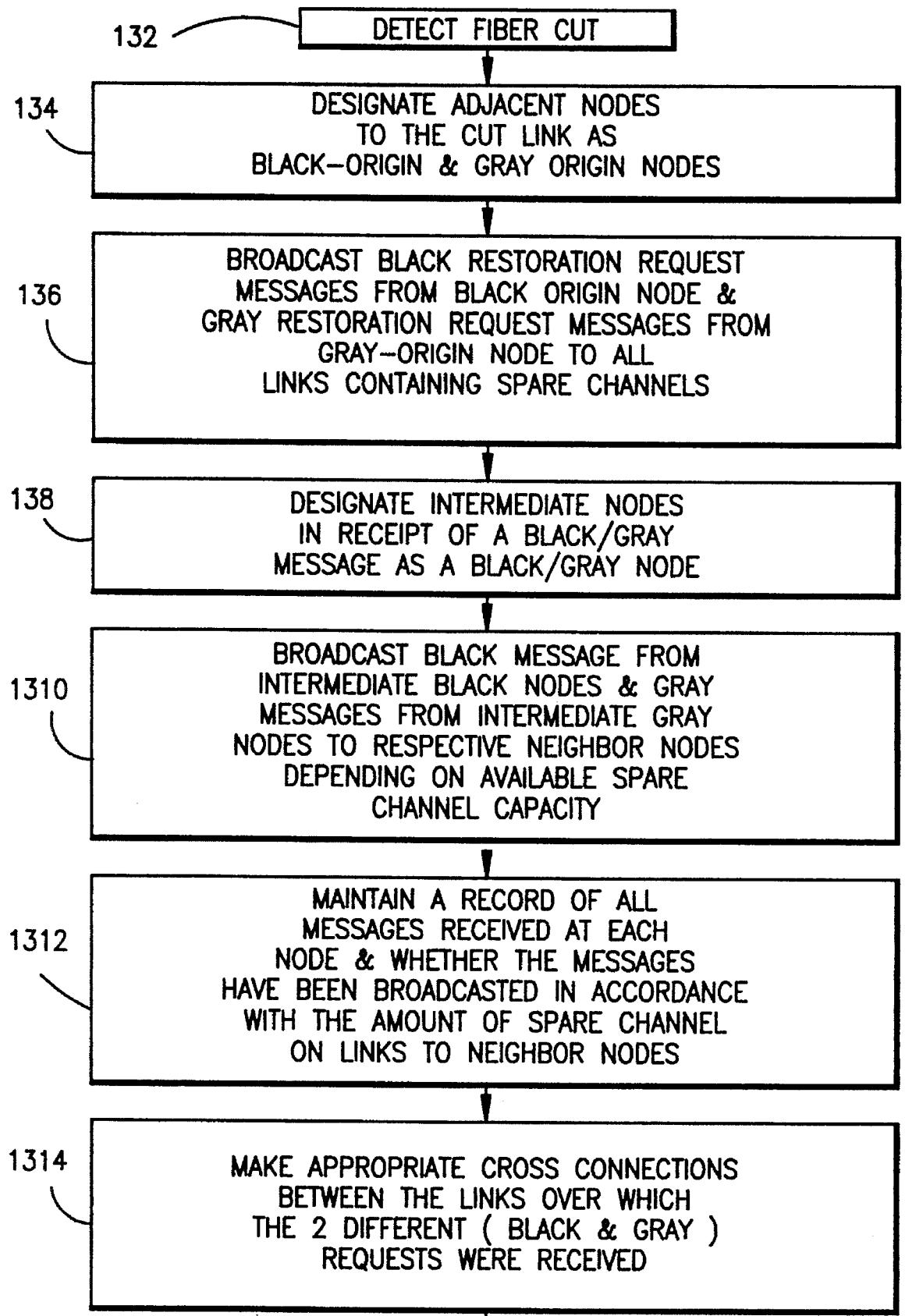
FIGS. 14a–14c in combination is a flow diagram illustrative of the present invention algorithm.
Figure 14B:
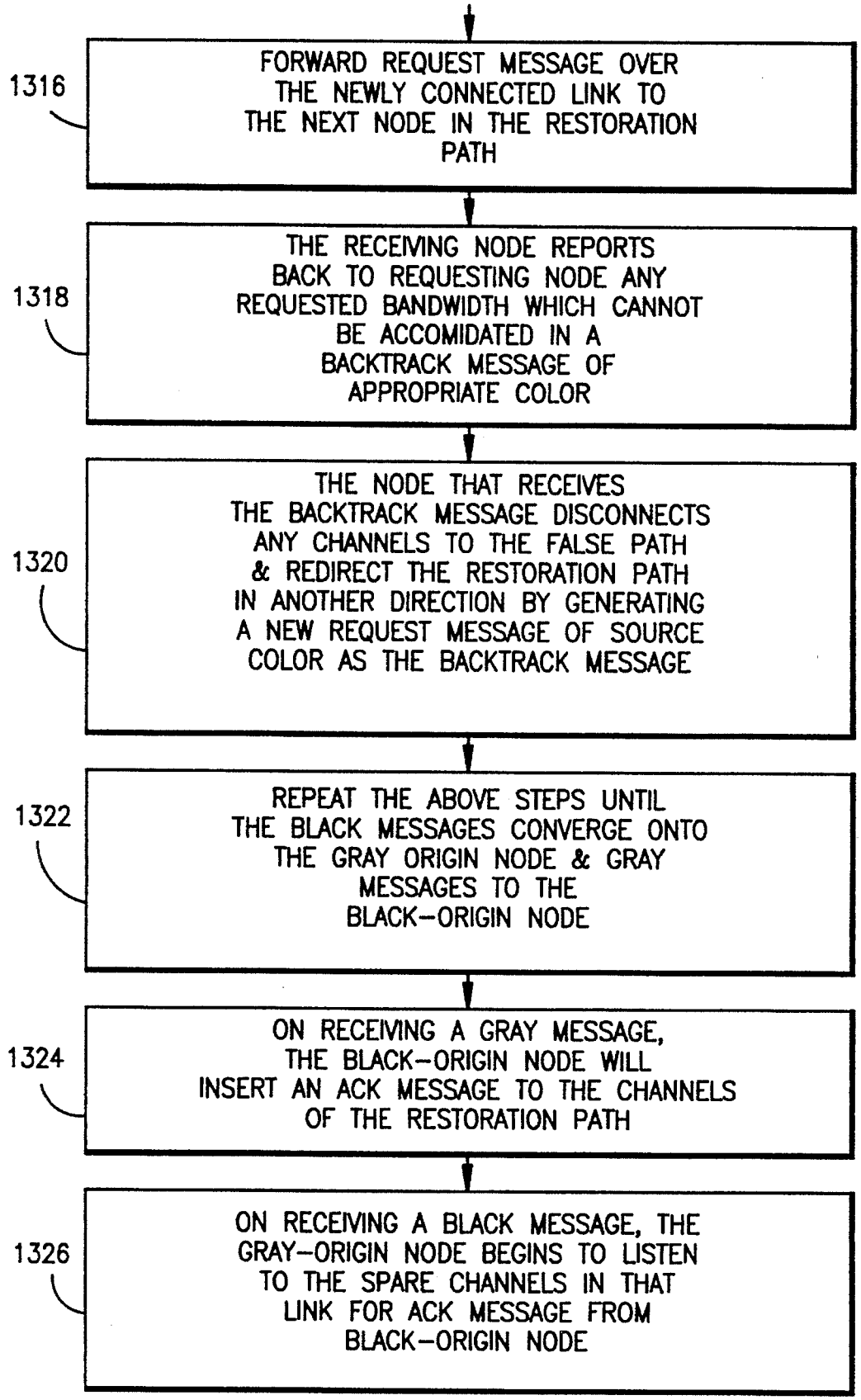
Figure 14C:
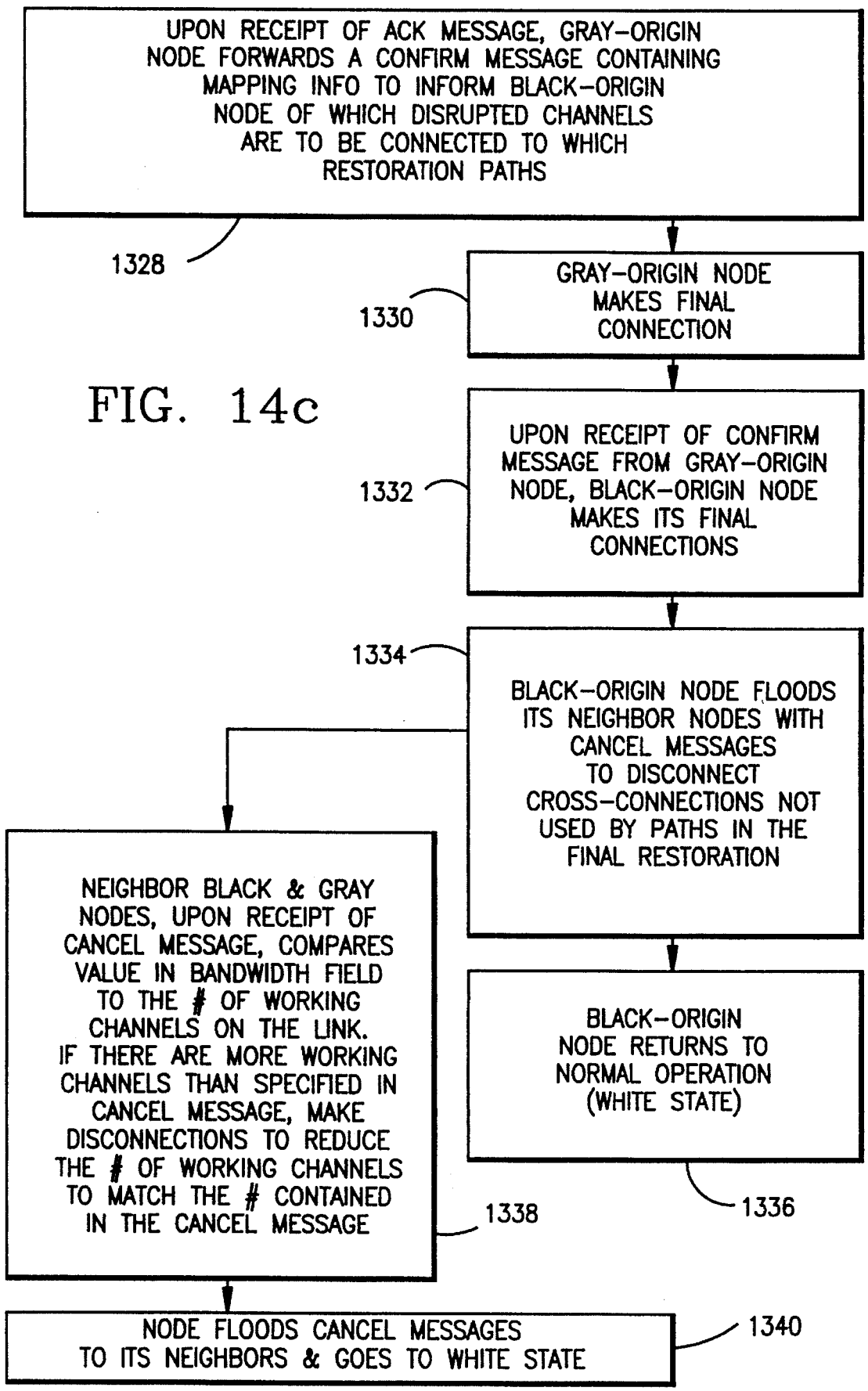

Refer now to the flow diagram of FIGS. 14a–14c. In particular, on detecting a fiber link cut (Step 132), one of the adjacent nodes to the fiber link cut is arbitrarily designated the Black Origin node, while the other adjacent node the Gray Origin node (Step 134). (It should of course be appreciated that other designations besides Black and Gray Origin nodes may also be used. For example, one of the end nodes may be referred to as first end node while the other of the end nodes may be referred to as the second end node.) Restoration is initiated from both nodes, with the Black Origin node broadcasting Black restoration request messages and the Gray Origin node broadcasting Gray restoration request messages (Step 136). These messages are sent out on all links which contain spare channels. Each restoration request message (Black or Gray) contains the pair ID of the Black Origin and Gray Origin nodes, the source of the message, the destination of the message and the requested bandwidth. Requested bandwidth is the minimum of the working channels lost due to the fiber link cut and the spare capacity of the particular link over which the specific Black or Gray message is being broadcasted.

On receipt of a Black or Gray message, an intermediate node becomes designated as a Black or Gray node, respectively (Step 138). Black intermediate nodes will selectively broadcast Black messages and Gray intermediate nodes Gray messages (Step 1310). A table is maintained of all messages which have been received, and whether or not they were broadcasted. Selection for broadcasting is determined by the available spare channel capacity on links to neighboring nodes (Step 1312). If there are available spare channels over a given link, the Black or Gray message is broadcasted. The requested bandwidth is the minimum of the arriving message's requested bandwidth and the remaining unrequested spare capacity of the link over which the request message is being sent. A 'scratch-pad' record of unrequested spare capacity is maintained so that successive Black or Gray messages can also be broadcasted. This scratch pad record ensures that the total amount of restoration bandwidth requested over any given link does not exceed the total number of available spare channels in that single link. This mechanism is referred herein as "floodgating".

As Black and Gray messages propagate across the network, Black messages begin to arrive at Gray nodes and Gray messages at Black nodes. Upon receiving a different "colored" request message, a node would effect appropriate cross connections between the links over which the two different (Black and Gray) requests were received (Step 1314). Once the cross connection has been made, the request message is forwarded over the newly connected link to the next node in the restoration path (Step 1316). A single message could trigger cross connections for multiple paths branching from a single node. If this occurs, each node on the other end of these newly connected links is informed of the number of spare channels which had been connected from that link. Any requested bandwidth which cannot be accommodated is reported back to the requesting node in a "Backtrack" message of the appropriate color (Step 1318).

Figure 3:
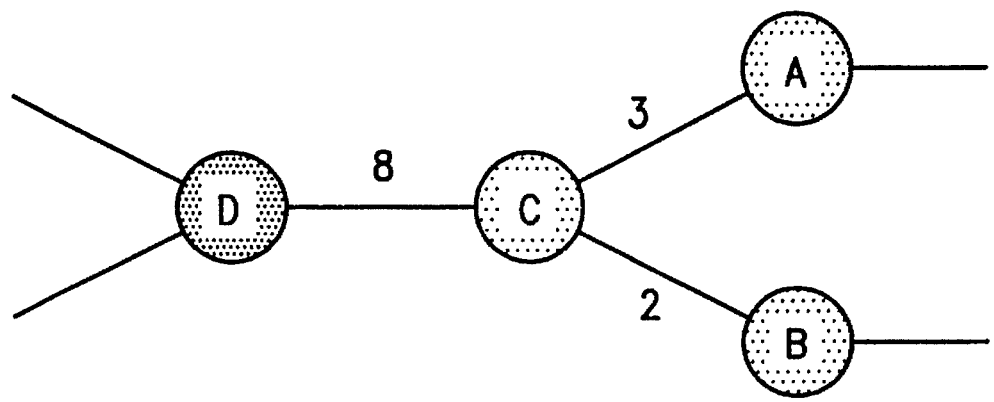
FIG. 3 is a simplified diagram of the way in which a message is processed by the present invention method.

With reference to FIG. 3, the aforementioned operations are further elaborated. Assume node C first receives a Gray message requesting 3 channels from node A. As node C becomes a Gray node, the request is recorded in its message table. Further, the request is propagated to nodes B and D. Later, node C receives another Gray message requesting 2 channels from node B. Again node C records this request and propagates the message to nodes D and A. Assume thereafter node C receives a Black message requesting 8 channels from node D. Node C would then cross connect three spare channels to node D with the three spare channels to node A. Node C also would forward a Black message to node A requesting 3 channels, and then cross connect two spare channels to node D with the two spare channels to node B. A Black message is then forwarded by Node C to node B requesting 2 channels. Since node C could support only 5 of the 8 channels contained in the Black request, node C would have to send a Backtrack Black message to node D to report that only 5 channels have been connected.

Return to FIGS. 14a–14c. Upon receipt of a Backtrack message, the node would disconnect any channels to the false path and redirect the restoration path in another direction by generating a new request message of the same color as the Backtrack message (Step 1320). If no alterative path exists, the Backtrack message is returned along the path over which the original request message came. When a Backtrack message is received by a Black Origin or Gray Origin node, disconnection, as required, is made.

The above steps are repeated until the Black messages converge to the Gray Origin node and Gray messages to the Black Origin note (Step 1322).

As restoration paths become established between the Black Origin and Gray Origin nodes, Black messages would converge on the Gray Origin node and Gray messages on the Black Origin node. On receiving a Gray message, the Black Origin node inserts an Acknowledge (Ack) message into the channels of the new restoration path (Step 1324). On receiving a Black message, the Gray Origin node begins to listen to the spare channels in that link for an Acknowledge message from the Black Origin node (Step 1326). Once this message is received, the Gray Origin node forwards a Confirm message containing mapping information to inform the Black Origin node which disrupted channels are to be connected to which restoration paths (Step 1328). Then the Gray Origin node makes the final connections to restore its disrupted channels (Step 1330). The Black Origin node, upon receipt of the Confirm message from the Gray Origin node, makes its final connections to restore the disrupted channels (Step 1332). Note that these Acknowledge and Confirm messages are sent in-band and do not require message processing by intermediate nodes.

Once the Black Origin node has restored all lost channels, it begins flooding Cancel messages to all its neighbor nodes (Step 1334). Cancel messages are used to terminate the restoration process and return the network to normal operation. In addition, the Cancel messages ensure that any cross connections which are not used by paths in the final restoration solution are disconnected. Furthermore, cancel messages contain the source and destination of the message and a bandwidth value. The value of this bandwidth is set to the number of working channels in the link over which the Cancel message is sent from the Black Origin node. After broadcasting these messages, the Black Origin node returns to normal operation or a White state (Step 1336).

When Black and Gray nodes receive a Cancel message, they will compare the value contained in the bandwidth field to the number of working channels on the link over which the message was received. If there are more working channels than the number specified in the Cancel message, disconnections are made to reduce the number of working channels so that they match the number contained in the Cancel message (Step 1338). The node then floods Cancel messages in the same manner as the Black Origin node and then goes to a White state. On receiving a Cancel message, the Gray Origin node would make any necessary disconnections and go to the White state (Step 1340).

When a White node receives a Cancel message, it would make any necessary disconnections. A White node selectively floods a Cancel message only to a neighboring node with which it made a disconnection. The bandwidth specified in this message is equal to the number of working channels existing on the link connecting the White node to its neighbor after the disconnection has been made.

Figure 1:
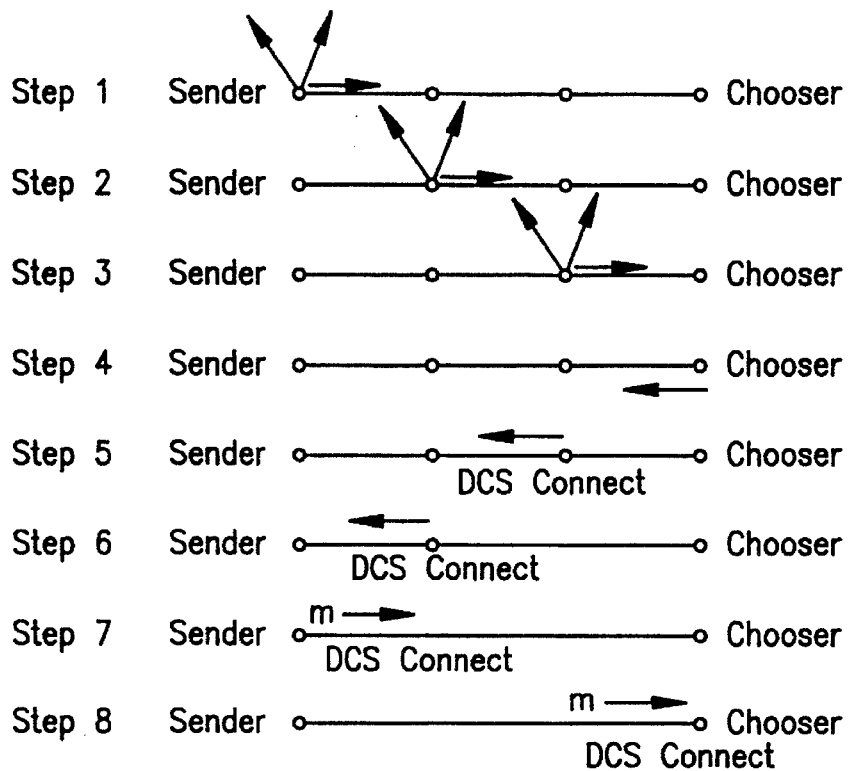
FIG. 1 is a diagram illustrating the execution steps of a Self-Healing Network algorithm.
Figure 2:
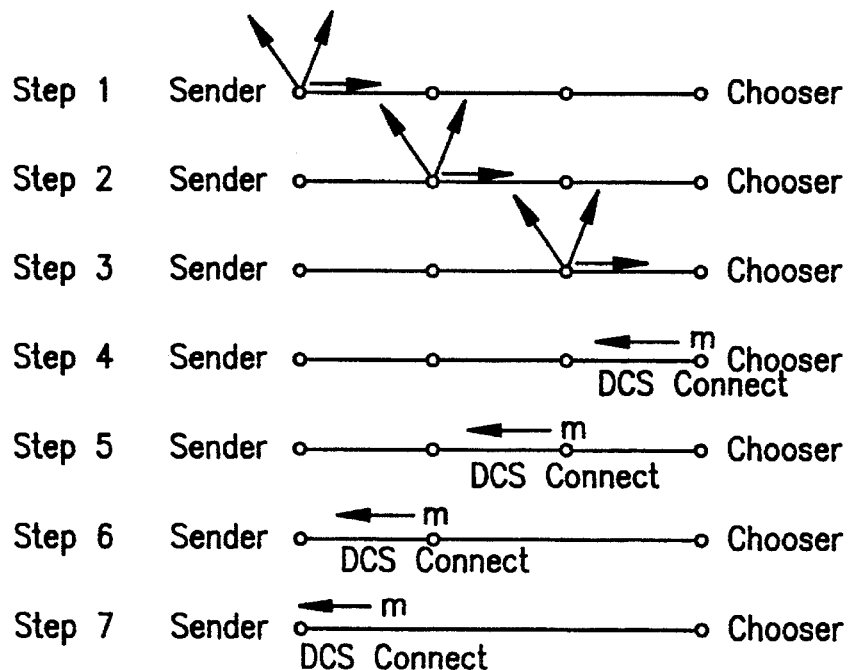
FIG. 2 is a diagram illustrative of the execution steps of Bellcore's FITNESS algorithm.
Figure 4:
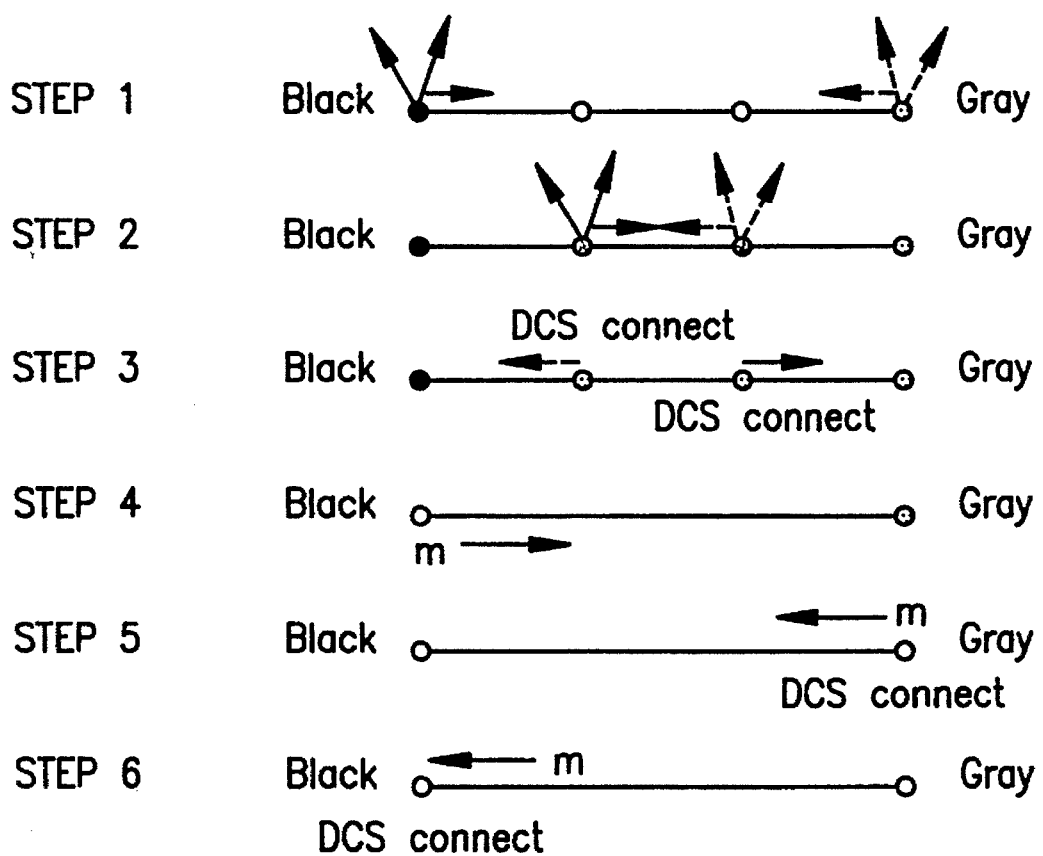
FIG. 4 is a diagram illustrating the execution steps of the present invention two prong approach.

FIG. 4 provides a comparison of the execution steps between the above-mentioned prior art approaches of FIGS. 1 and 2 and the present invention two-prong approach on a restoration route. Note that by letting both end nodes broadcast the request message, the intermediate nodes start the DCS connection as early as Step 3. Compare this with the FITNESS approach of FIGS. 2 which performs DCS connection after Step 4.

In operation, FIGS. 5a–5d show how the restoration messages are processed in a network. With the exception of the number labelled (9) on the link between Nodes A and F which represents 9 working channels, the number label on each link represents the number of available spare channels. Assume that a single link failure has occurred between Nodes A and F with the loss of 9 working channels. Further assume that node A becomes the 'Gray Origin' node and Node F becomes the 'Black Origin' node. Both nodes, immediately upon detection of the fault, begin flooding messages to their neighbor nodes.

Figure 5A:
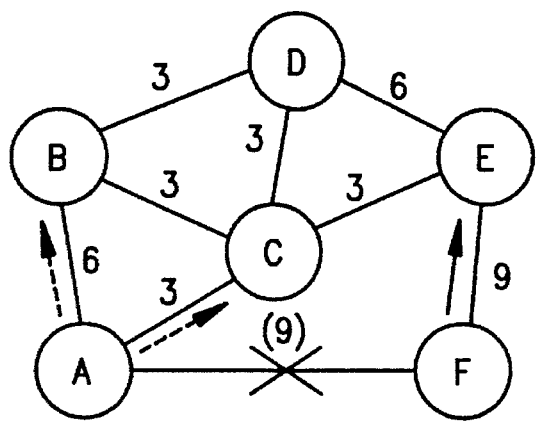
FIGS. 5a–5d are diagrams illustrating the way in which message processing occurs in the present invention method.

FIG. 5a shows the initial propagation of messages: Gray message for 3 channels from Node A to C, Gray message for 3 channels from Node A to B, and Black message for 9 channels from Node F to E.

Figure 5B:
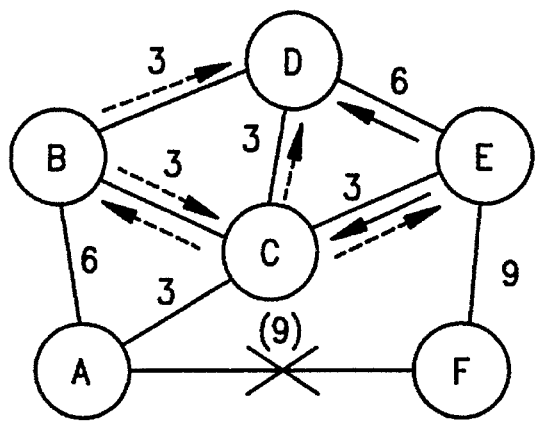

In FIG. 5b, the second stage of message propagation is shown: Gray message for 3 channels from Node B to D, Gray message for 3 channels from Node B to C, Gray message for 3 channels from Node C to B, Gray message for 3 channels from Node C to D, Gray message for 3 channels from Node C to E, Black message for 3 channels from Node E to C, Black message for 6 channels from Node E to D. Node C has now received Gray messages from Nodes A and B and also a Black message from Node E. Since the Gray message from Node A arrived earlier than the Gray message from Node B, Node C makes cross connections for 3 channels on the links connecting Node C with Nodes A and E. Node C also forwards the Black message from Node E to Node A. However, Node C does not broadcast the Black message.

Note that Node E is able to concurrently effect cross connections between Node C and Node F for the same path Node C is building. Similarly, Node D effects cross connections for the Gray and Black messages it received from Node B and Node E, respectively, and also for the Gray and Black messages it received from Node C and node E, respectively.

Figure 5C:
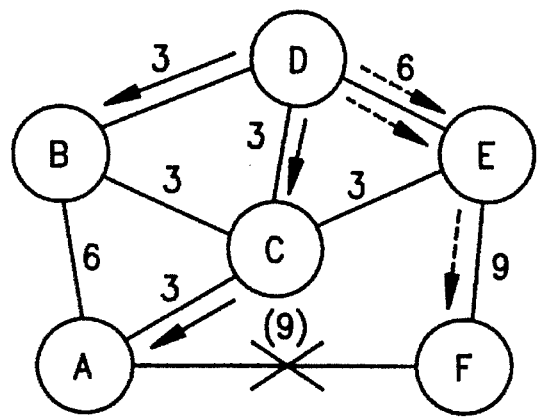

FIG. 5c shows the resulting message flows: Gray message for 3 channels from Node E to F, two Gray messages for 3 channels each from Node D to E, Black message for 3 channels from Node D to B, Black message for 3 channels from Node D to C, and Black message for 3 channels from Node C to A. Node C now makes cross connections for the Gray message it received earlier from Node B and the Black message now arriving from Node D.

Figure 5D:
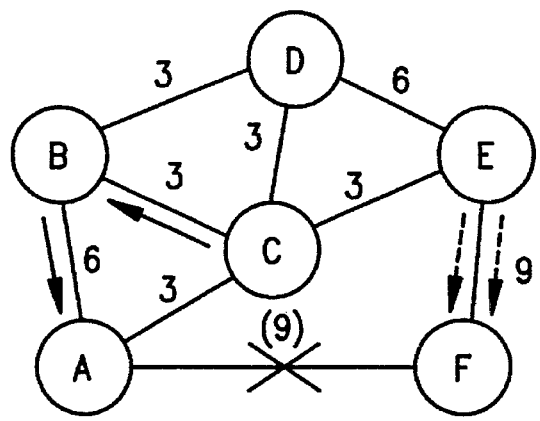

FIG. 5d shows the Black and Gray messages converging on the Origin nodes. At this point the final solution is clear. There are three paths used in the final restoration solution: Path 1 is A-C-E-F for 3 channels, Path 2 is A-B-D-E-F for 3 channels, and Path 3 is A-B-C-D-E-F for 3 channels. A total of 36 spare channels are therefore used in this restoration solution.

The table of FIG. 6 illustrates the state transitions of the algorithm of the present two prong invention.

Figure 7:
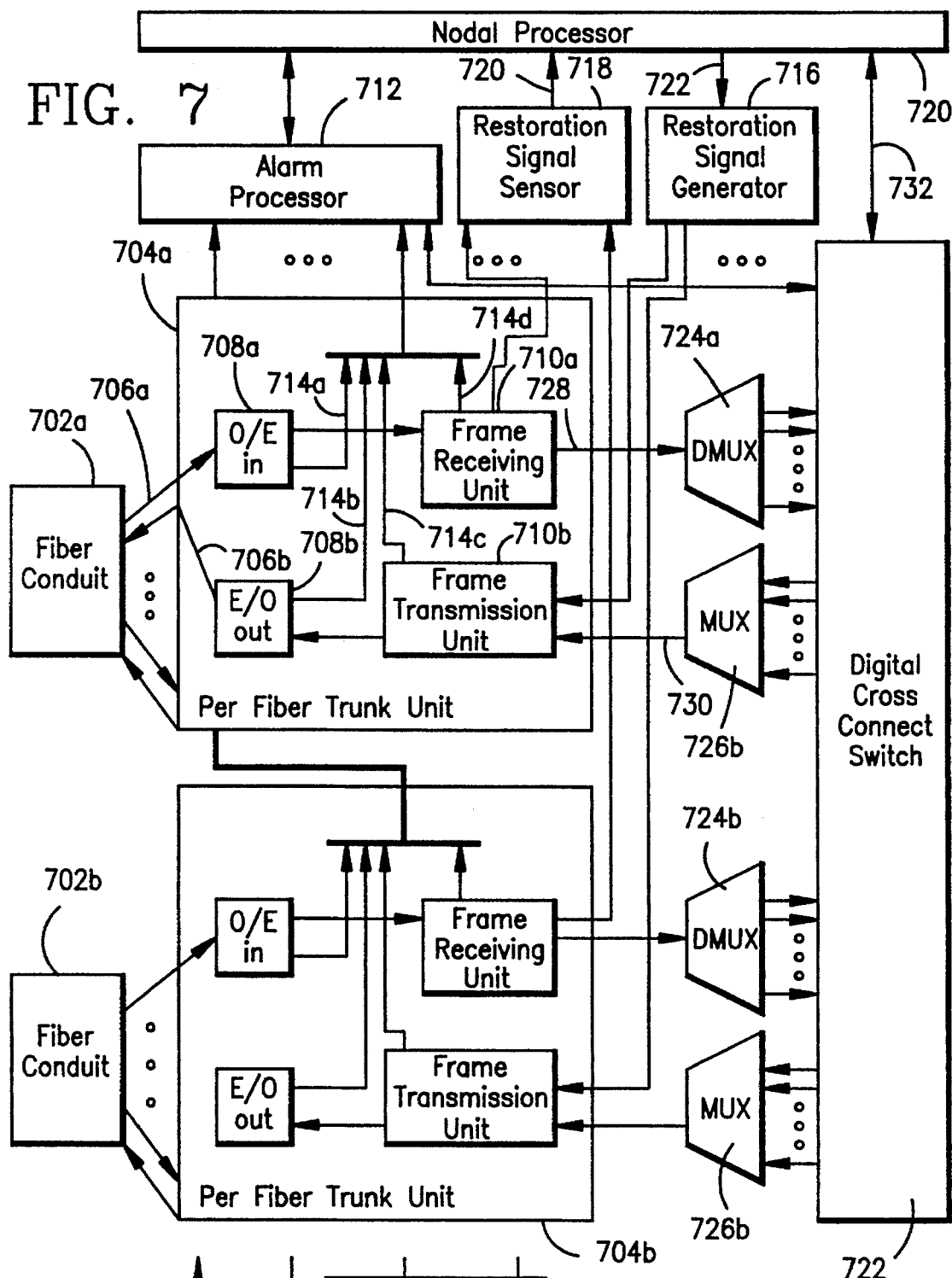
FIG. 7 is a block diagram illustrating the different components used in a node to implement the two prong approach of the present invention.

With reference to FIG. 7, the components for effecting the present invention method of restoring a communications network based on a two prong approach are shown. Do note that with the exception of the fiber conduits or fiber trunks (702a and 702b), all of the components shown in FIG. 7 reside in a node of the network.

In particular, inside a node of the communications network, for receiving information, in the form of frames, from the fiber conduits are a plurality of fiber trunk units 704. For the instant discussion, it should be appreciated that albeit only two fiber conduits are shown, in actuality a plurality of fiber conduits (up to a predetermined number) are connected to the node of FIG. 7. Each of these fiber conduits, for example fiber conduit 702a, carries a number of links, with each link comprising at least a pair of optical fibers, for example fibers 706a and 706b. Inside each of the fiber trunk units, for example unit 704a, an optical to electrical signal converter (O/E) 708a is used to convert the optical signals being provided from fiber conduit 702a via fiber optics 706a to an electrical signal for further processing. A corresponding electrical to optical signal converter (E/O) 708b is also provided with in fiber trunk unit 704a for performing the converse operation, that is—converting an electrical signal provided within the node to an optical signal to be output via fiber optic 706b to fiber conduit 702a.

Electrically connected to optical to electrical signal converter 708a is a frame receiving unit 710a whose function, as its name implies, is to receive the frames of information output from optical to electrical converter 708a. A corresponding unit that performs the reverse function of frame receiving unit 710a is a frame transmission unit 710b, also provided within fiber unit 704a for outputting electrical information to electrical to optical signal converter 708b. For this discussion, it is assumed that the transmission of information in the network is by means of frames with appropriate header and data portions. In other words, for this discussion, the portion of the frame carrying user data may also be referred to as the payload field. The portion of the frame that carries the synchronization and network management information may also be referred to as the frame overhead. And in the case of a synchronous network, it should be appreciated that flames are sent periodically but that not necessarily all of the flames contain network management information, as the network management fields in those flames may be empty and thus carry no information. As was stated previously, there may be a plurality of fiber trunk units 704 resident in the node, with the number of units corresponding to the number of pairs of optical fibers being provided to the node.

Each of the fiber trunk units 704 is electrically connected to an alarm processor 712. In essence, the main function of alarm processor 712 is to detect any fiber cut in the link connecting the node to an adjacent (or neighbor) node. This is achieved by alarm processor 712 being continuously monitoring the output from O/E converter 708a and E/O converter 708b per lines 714a and 714b, respectively. Also being provided as an input to alarm processor 712 is information output from frame transmission unit 710b via line 714c and frame receiving unit 710a via line 714d. Thus, if there is a cut in the link, such cut would be registered in the frame being provided to O/E converter 708a. This information consequently is fed via lines 714a to alarm processor 712. The seriousness of the cut, which helps in determining whether the present invention restoration process takes place, depends on the severity of the cut.

Also residing in the node is a restoration signal sensor 718 and a restoration signal generator 716. Both sensor 718 and generator 716 are connected to a nodal processor 720, albeit that sensor 718 provides input information via line 720 while generator 716 accepts output from processor 720 via line 722.

As further shown, nodal processor 720 is electrically connected bidirectionally with a conventional digital cross connect switch 722, which has connected thereto a plurality of corresponding pairs of the demultiplexers 724 and multiplexers 726. The demultiplexers, for the example demultiplexer 724a, receives its input via line 728 from frame receiving unit 710a of fiber trunk unit 704a. Multiplexer 726b, on the other hand, provides output via lines 730 to frame transmission unit 710b of fiber trunk unit 704a. The other pairs of demultiplexers/multiplexers in a node are similarly connected to their respective fiber trunk units and the digital cross connect switch. See for example demultiplexer/multiplexer pair 724b and 726b. The different components described above may be obtained from the Telco Systems Company of Norwood, Mass.

With reference to the operation of the different components of the FIG. 7 node, do note that each of the fiber conduits 702 contains several fiber trunks, with each fiber trunk comprising at least two pairs of optical fibers transmitting data in opposite directions. As was stated before, an incoming optical signal is converted by O/E converter 708a to a corresponding electrical signal. This electrical signal is then fed to frame receiving unit 710a where frames are recovered and their integrity checked. If a frame has not be corrupted, it is relayed to demultiplexer 724a, via lines 728, where the individual channels noted in the frame are demultiplexed. The demultiplexed channels are then switched to an outgoing trunk by digital cross connect switch 722. Do note that the restoration signal imbedded in the network management frame overhead portion is extracted by frame receiving unit 710a and forwarded to restoration signal sensor unit 718.

As is well known, frame receiving unit 710a detects the bit information in the frame on line in order to find out the starting and end points of the frame, in addition to checking for the integrity of the frame. It should further be appreciated that only a portion of the frame, i.e., the data field, is forwarded to the demultiplexer and multiplexer pairs, and then to cross connect switch 722. The outgoing data from digital cross connect switch 722 is sent to multiplexer 726b and then forwarded via line 730 to frame transmission unit 710b, where it merges with the network restoration information from restoration signal generator 716 to form an outgoing frame. The outgoing frame is converted by E/O converter 708b into an appropriate optical signal, which then is forwarded to the trunk of fiber conduit 702 via line 706b.

A cut in the link of fiber conduit 702a can be detected in two ways by fiber trunk unit 704a. First, the incoming signal can be detected as corrupt by O/E converter 708a, at which time O/E converter 708a sends an alarm signal, in the form of an alarm report, to alarm processor 712 to report detection of a cut. Second, the optical signal is deemed not corrupt, but nonetheless may have a frame error. In which case, frame receiving unit 710a would detect the error and send an alarm report to alarm processor 712. The alarm report is stored inside alarm processor 712 for a short while, as it is desirable to detect whether other fiber trunks in the fiber conduits have also been cut, since there may be 20 fiber trunks in a single fiber conduit. If a number of the fiber trunks are cut (or the fiber conduit is cut), all of those cuts would have to be correlated so that only a single report is sent to nodal processor 720. By thus correlating all of the alarm reports from the different cuts, the vast volume of alarm reports that would have overloaded nodal processor 720 is eliminated.

Nodal processor 720, upon receipt of the correlated alarm reports from alarm processor 712, executes the appropriate restoration logic, and initiates the restoration messages to restoration signal generator unit 716. When the restoration message is received as described above, the restoration message is detected by frame receiving unit 710a and transmitted to restoration signal sensor trait 718. Restoration signal sensor unit 718 then correlates and forwards the restoration request messages to nodal processor 720. Upon receipt of the restoration request from both disrupted ends of the cut link, nodal processor 720 issues the connection commands via line 732 to digital cross connect switch 722 to establish the connections.

In synchronous optical network (SONET) and asynchronous transfer mode (ATM) environments, the switch connection commands from nodal processor 720 are replaced by downloading the corresponding entries to the virtual channel identifier (VCI) translation tables that are conventionally associated with the fiber trunks.

In evaluating the algorithm of the present invention against other restoration techniques, five performance metrics were identified. They are:

1) Time to restoration.
2) Level of restoration.
3) Utilization of spare channel resources.
4) Range of application.
5) Message volume.

The time to restoration metric refers to the time required by the technique to complete execution to whatever level of restoration it can achieve. Since it is desirable to accomplish restoration as quickly as possible to avoid call dropping, this is an extremely important metric. Ideally, an algorithm must achieve full possible restoration, including completion of any required cross-connections, in less than two seconds.

The level of restoration metric refers to how many of the lost working channels are restored. The ideal is that all lost channels be restored. However, this may not always be possible, as three situations can occur which limit restoration. The first situation is that there is not sufficient spare capacity in the network to support restoration of the lost working channels, even with an optimal algorithm. While there may be considerable spare capacity within the overall network, another situation can occur if the spare capacity is distributed in such a way that restoration cannot be achieved in a specific failure scenario. Typically, this happens when a node adjacent to the link failure has too few spare channels to its neighbor nodes to restore the lost working channels. Moreover, certain network topologies can create situations which are pitfalls for distributed algorithms using a heuristic approach to path finding or restoration path selection. Such situations can result in the algorithm achieving a less than optimal level of restoration.

Figure 8:
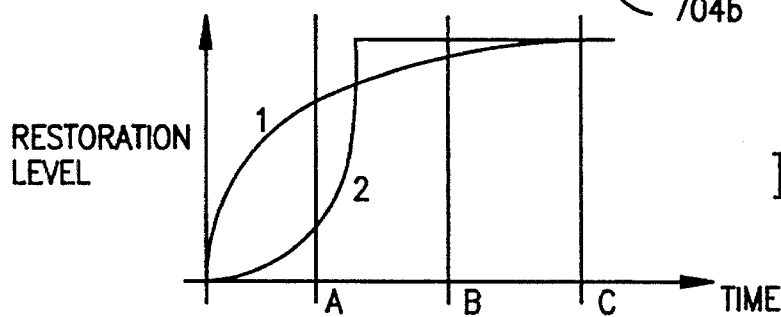
FIG. 8 is a chart providing demonstration of the restoration level in comparison to the time to restoration level.

Performance metrics 1 and 2, when combined, are the most critical performance criteria for any network restoration algorithm. The ideal is a 100% restoration within two seconds. In situations in which an algorithm cannot achieve full restoration within two seconds, the rate at which the algorithm restores lost channels can be important. FIG. 8 illustrates this point. The vertical axis represents level of restoration and the horizontal axis the time required to achieve that level of restoration. The two curves represent the rate at which two algorithms, 1 and 2, achieve increasing levels of restoration. Three time marks, A, B, and C, are shown. If two seconds of elapsed time occurs at time mark C, then both algorithms have restored 100%. If, however, two seconds of elapsed time occurs at time mark A, then algorithm 1 is clearly superior to algorithm 2 as it achieves a higher level of restoration. On the other hand, if two seconds of elapsed time occurs at time mark B, then the restoration level achieved by algorithm 2 is higher than algorithm 1.

Performance metric 3, utilization of spare channel resources, refers to how many spare channels are switched to working channels to replace lost working channels. All link restoration approaches require at least twice as many spare channels to replace the working channels lost. Since bandwidth is a limited (and expensive) resource within the network, it is desirable that as few spare channels as possible be employed in the restoration solution.

The range of application performance metric refers to what different kinds of failure scenarios the algorithm can be applied to affect restoration. A number of the proposed distributed algorithms can only address single link failures. A limited number of algorithms can be used to restore lost working channels in multiple link failure and node failure scenarios.

The message volume performance metric refers to how many network restoration messages are generated by a restoration algorithm. It is desirable that the number of messages an algorithm generates be as few as possible. Not only does message volume affect performance metric 1 (time to restore), it also limits other network restoration message traffic flow during the restoration process which may be of high or critical priority.

It should be noted that the number of distinct paths an algorithm uses in its restoration solution have not been included among the performance metrics. Although a high correlation has been found between the number of paths used in a restoration solution and the time to restoration metric of a specific algorithm, when comparing across algorithms, this correlation does not exist. As regards the merits, in and of itself, for having fewer or greater numbers of paths in a restoration solution, no particular benefit is found for either one. In general, while some differences were found among the several algorithms in the number of distinct paths used in the final restoration solutions, they often are the same and reflect more the topology of the network and the location of the link failure, rather than the heuristic methods of the algorithms.

Seven functional characteristics which can be attributed to distributed network restoration algorithms have been identified. These are related to certain fundamental tasks which an algorithm must perform in the restoration process when using a distributed approach. These functional characteristics can be used to systematically analyze distributed network restoration algorithms to understand how they function and perform. These Functional characteristics are:

1) Find paths
2) Resolve spare channel contention
3) Select restoration paths
4) Control message volume
5) Control congestion
6) Counter race conditions
7) Connect restored paths Functional characteristic 1, find paths, relates to how an algorithm identifies possible restoration paths. Most distributed algorithms use some form of flooding to do this. Ideally, all paths which can be used in restoration are identified. There are also two approaches in finding paths. One is to limit, through some heuristic mechanism, path finding to a subset of all paths in a network. The other approach is to perform an exhaustive tracing of all paths in the network. This functional characteristic is fundamental to the performance of the algorithm, as it affects all other functional characteristics and the final Performance metrics.

Functional characteristic 2, resolve spare channel contention, relates to how an algorithm resolves multiple requests for the same spare channel. Since all the candidate restoration paths in a restoration solution usually are not disjoint paths, there is some competition among these paths for available spare channels. At some point in the execution of these distributed algorithms there exists the potential that the same spare channel may have more than one reservation or attempted reservation made to use it in the restoration solution. Such contention must either be avoided or resolved by the algorithm. The method used to resolve spare channel contention can have critical impact upon the level of restoration achieved and the message volume.

Functional characteristic 3, select restoration paths, refers to the process the algorithm uses to select from among the identified candidate paths those which are to be used in the restoration process. Most of the distributed algorithms use a 'first come, first served' approach which is effectively a shortest path heuristic. Some, however, do use other heuristic based on other factors such as the bandwidth of the path. Since the selection process revolves contention for spare channels, there is often a strong relationship between selection of restoration paths and resolution of spare channel contention. In fact, in some algorithms, both are simultaneously executed in some centralized body of code in a node which is given specific responsibility to select restoration paths from those available. Path selection can have critical impact upon the level of restoration which is achieved and the utilization of spare channels.

Functional characteristic 4, control message volume, refers to the mechanisms the algorithm uses to reduce the number of messages generated during execution of the algorithm. It is desirable that algorithms generate as few messages as possible. A large number of messages has an adverse impact upon the time to restore metric and affects the network's capacity to process other time critical network restoration messages not involved in the restoration algorithm. Some algorithms inherently generate fewer messages than others, but most employ some heuristic mechanism to further reduce message volume. The most commonly used heuristic is hop count. That is, a message used to reserve spare bandwidth contains a field which counts the number of nodes through which it has been transmitted. When some predefined limit is reached, the message is ignored and not propagated further. A similar heuristic is a time stamp which lets a message die after a certain time period such as 1 second (half the 2 second time constraint). Some algorithms use more sophisticated methods.

Functional characteristic 5, control congestion, refers to the techniques an algorithm uses to control message congestion at critical nodes. This characteristic is related to functional characteristic 4 and is strongly affected by functional characteristic 1. Critical nodes are nodes which, because of their location within the network, process a larger number of messages than other nodes in the network. Typically these are nodes in a 'hub' type position, i.e. a node with a relatively high connectivity, or nodes which are adjacent to the failed link or node. Nodes adjacent to a failure site are usually more critical than 'hub' nodes in that they normally assume special roles and have additional responsibilities in the restoration process. In some distributed algorithms, congestion is the key component affecting time to restoration. An algorithm which produces high congestion at a critical node loses many of the benefits of parallelism which are sought by using a distributed approach. All the other nodes are able to quickly process their messages and completion of the algorithm's execution becomes dependent upon a single node's ability to process a much greater number of messages.

Functional characteristic 6, counter race conditions, refers to an algorithm's method to control or respond to race conditions during execution of the restoration algorithm. A network topology affects the speed with which messages propagate through a network. The timely arrival of a message, or the relative arrival times of messages to a certain node, may affect performance of an algorithm. Particularly affected may be the restore time and the level of restoration performance of the algorithm. Some algorithms are not adversely affected by race conditions while others may be severely affected. Those which can be affected by race conditions require certain mechanisms to counter race conditions. These typically are tables which record information from messages received earlier to compare with messages arriving later or some time out mechanism to allow the arrival of a larger number of messages before some specified action is taken.

Functional characteristic 7, connect restored paths, refers to the method used by the algorithm to make final restoration path connections. Most algorithms use a three phase approach: identify a path between the two end nodes, an acknowledgment is sent from one node to the other, the second node then sends a confirmation that the path has been connected. This process is usually handled by network restoration messages which are relayed from node to node over the restored path.

The algorithm of the present invention two prong method differs from other algorithms in several respects. These differences are best identified by analyzing its functional characteristics as stated above—that is, how the algorithm finds paths, resolves spare channel contention, selects restoration paths, controls message volume, controls congestion, counters race conditions and connects restored paths.

The two prong algorithm finds paths by flooding Black and Gray messages across the network. The path traveled by a Gray message, from the Gray Origin to the Black Origin, defines a path. Initially, this flooding is very similar, in most respects, to the flooding mechanisms used by other distributed network restoration algorithms. However, once a Gray message encounters a Black node, it no longer is flooded to all the Black node's neighbors. Instead it is forwarded to the first neighbor node to have sent a Black message to the Black node. This results in the Gray message homing in towards the Black Origin node, directly following a path that has been traversed earlier by a Black message. This also helps to reduce message volume. Meanwhile, the same process is also happening to the Black messages which are travelling a path from the Black Origin node to the Gray Origin node. The resulting effect is a shortest path heuristic as the messages which arrive the earliest at an origin node have traversed a shorter route than later arriving messages.

It should be noted that many of the paths which are used in the final restoration solution are what has been described as natural paths. That is, paths which are easy to find using a shortest path methodology. In test results, it was found that 75% to 100% of the paths used in a restoration solution are easily found by simple flooding. Some restoration scenarios, however, have more complicated solutions. To find these other paths, the two prong approach uses redirection and sometimes backtracking logic to attempt connections among alternate paths. In comparison, the Self-Healing Network and RREACT algorithms use an exhaustive search of all possible paths to find all the restoration paths. The FITNESS algorithm, on the other hand, uses multiple waves to find all restoration paths.

An example of how complicated a restoration solution can be even for a simple network and how the two prong algorithm finds the restoration paths in the network can be gleaned from FIG. 5, discussed above, which is also known as the "Three Finger Problem".

The two prong algorithm uses several mechanisms to resolve spare channel contention. The first is the use of 'floodgates' to reduce spare channel contention. Unlike most other distributed algorithms which flood multiple messages over a link without regard to the total bandwidth which has been requested by these messages, the two prong algorithm keeps track of the total requested bandwidth over a single link and will not forward requests for more bandwidth than the link can support. This mechanism in and of itself does not stop spare channel contention, but does substantially reduce the problem. Spare channel contention occurs in the two prong algorithm when multiple paths have a common upstream node which flooded the Gray or Black message to its neighbors. Because of this propagation, the node ends up generating more bandwidth requests than it had received from the node before it 'over commits' the link from which it received the message. This is identified as the 'Funnel Problem'. To overcome this problem, the two prong algorithm uses a backtracking logic to re-route messages to other available paths. Such backtracking usually happens at the node at which the propagation occurs and causes the over capacitation of the link. A simple example of the Funnel Problem is illustrated herein with reference to FIG. 9.

Figure 9A:
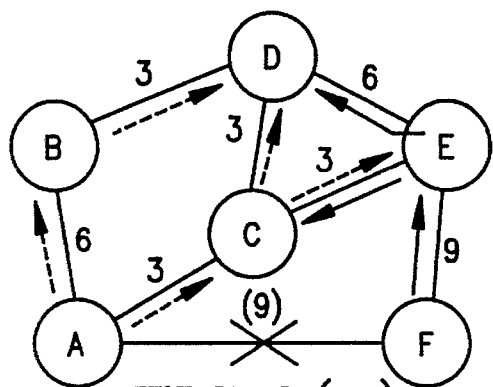
FIGS. 9a–9d are diagrams illustrating a "Funnel" problem.

Note that although the network topologies of the Three Finger Problem (illustrated in FIG. 5) and the Funnel Problem are very similar, the actions taken by Node C (a 'hub' node) are quite different. Assume again that there is a single link failure between Nodes A and F. Again these two nodes begin to flood messages to their neighbor nodes. This initial flooding is shown in FIG. 9a. The Funnel Problem results when Node C, having received a Gray message for 3 channels from Node A but not having received any Black messages, floods this Gray message to Nodes D and E. Each flooded Gray message from Node C is for 3 channels. This is actually a multiple of the original request for 3 channels and results in a situation in which both Nodes D and E think they can each make a connection for 3 channels with Node C.

At this point, Node C has already made cross connections between Nodes A and E. Node D has received Gray messages from Nodes C and B and a Black message from Node E. Node D will try to first make connections between Nodes C and E (it assume here that the Gray message from Node C arrived before the Gray message from Node B), by attempting to connect 3 channels from Node C with 3 channels from Node E and connect 3 channels from Node B with 3 channels from Node E.

Figure 9B:
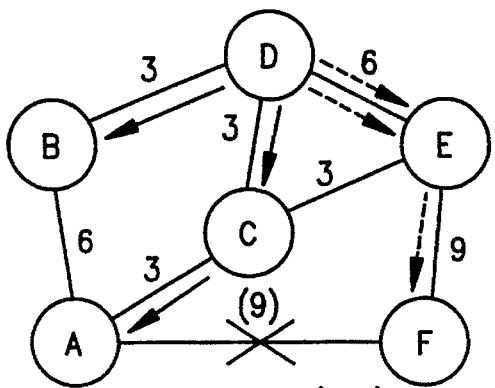

FIG. 9b shows the resulting messages: Gray message for 3 channels from Node E to F, two Gray messages for 3 channels from Node D to E, Black message for 3 channels from Node C to A, Black message for 3 channels from Node D to C, and Black message for 3 channels from Node D to B.

At this point, Node C receives the Black message which it cannot connect since it has already allocated all available spare channels with Node A. Therefore, Node C now sends a Backtrack Black message to Node D. All the other Gray and Black messages are processed in ways previously described.

Figure 9C:
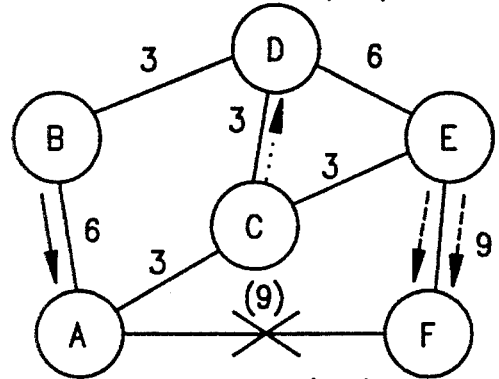
Figure 9D:
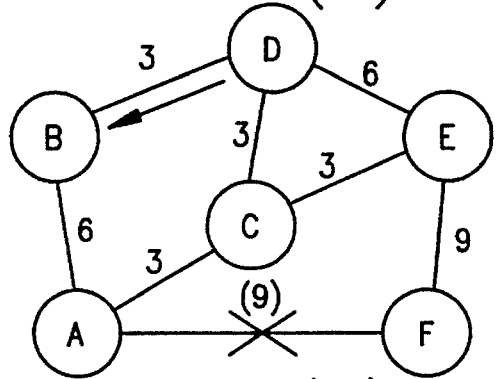

FIG. 9c shows the resulting messages: Black message for 3 channels from Node B to A, two Gray messages for 3 channels each from Node E to F, and a Backtrack Black message from Node C to D. Node D, upon receipt of the Backtrack Black message from Node C, will try to redirect the original Black message request for 3 channels in another direction. The node has kept a record of the Gray messages it has seen and redirects the request to Node B by forwarding a Black message for 3 channels. FIG. 9d shows this taking place.

The final restoration solution for the Funnel Problem results in the following three paths: (1) Path A-C-E-F for 3 channels, (2) Path A-B-D-E-F for 3 channels, and (3) Path A-B-D-E-F for 3 channels. Note that Paths 2 and 3 can be thought of as a single path with a bandwidth of 6 channels. But since they were separately created, such paths are counted as distinct paths in the performance analysis.

The Self Healing Network algorithm resolves spare channel contention by reserving specific spare channel capacity to restore specific disrupted channels. The Self Healing Network algorithm is able to do this since it does not use aggregate bandwidth request messages, but instead uses single signatures for each individual channel lost. The REACT algorithm resolves spare channel contention by building a complete data base of the current state of the network and updating this data base as it selects restoration paths. The FITNESS algorithm resolves spare channel contention by heuristic methods which limit request message flooding and by selecting a single restoration path during each wave of request messages.

The two prong algorithm selects restoration paths on a 'first come, first served' basis. As each individual Gray message arrives at the Black Origin node, it sends an Ack message which is inserted into the established channel on a path which is usually connected all the way to the Gray Origin node. Since cross connections are made very early in the restoration process and many restoration paths are quickly identified, the two prong algorithm is able to begin restoration of the lost channels very quickly. This is in effect a shortest path heuristic and also favorably affects, in most instances, the utilization of spare channel resources.

The Self-Healing Network algorithm similarly uses a 'first come, first served' restoration path selection mechanism. This results in some of the same features as the two prong algorithm, that is, early restoration of lost channels and good utilization of spare channel resources. The RREACT algorithm, in its basic form, also uses a first come, first served process. There are improvements to the algorithm under study which use a more advanced restoration path selection process. It should be noted, also, that the RREACT algorithm generally has the best spare channel utilization of all the algorithms tested. This is due to its path finding, spare channel contention resolution, and restoration path selection processes.

The FITNESS algorithm uses a time-out to collect a number of request messages from the Sender node at the Chooser node. The designers of the FITNESS algorithm consider it beneficial that the FITNESS algorithm selects from among the available paths the one with the greatest bandwidth. This is, in part, necessary to the performance of the algorithm which restores only a single path in each wave of messages. The greater bandwidth heuristic helps to reduce the number of paths and waves the algorithm uses to restore the lost channels. Unfortunately, this also adversely impacts upon the utilization of spare channels, since the path with the largest bandwidth is often not the shortest path, and contains links that are part of shorter paths with less bandwidth (over their entire lengths). These shorter paths often do not get chosen until later waves, by which time some of their bandwidth has already been lost to earlier selections which results in a less resource efficient solution. The multi-wave, time-out path selection process the FITNESS algorithm uses also has an adverse effect upon the time to restoration metric. The FITNESS algorithm generally performs well behind the other algorithms in this regard.

The two prong algorithm controls message volume through the heuristic of message forwarding and floodgating. As already described, once a Gray message encounters a Black node, it no longer is further flooded, instead it is forwarded. Likewise, once a Black message encounters a Gray node, it is only forwarded and not further flooded. This in itself considerably reduces message volume since a message is flooded across only about half the network. Floodgating also serves to reduce message volume, since many late arriving messages are not flooded once all available spare channel capacity on all links from a node has already been reserved.

The Self-Healing algorithm does not have a mechanism to control message volume. The algorithm is dependent upon low level hardware adaptations to process signature messages as they propagate across the network. It should be noted that the Self-Healing algorithm's signature messages only requests a single bandwidth. All the other algorithms make aggregate bandwidth requests. The RREACT algorithm generates a great number of messages since it performs an exhaustive trace of all possible paths from the Sender node to the Chooser node. However, it does prevent messages from tracing duplicate paths and a time value heuristic which kills 'Seek' messages which are more than one second old is applied. The FITNESS algorithm requires each node to keep a table of the messages it has seen. Messages which arrive and request a smaller bandwidth than earlier messages are disposed of. The FITNESS algorithm also employs a hop count mechanism and can be implemented with a hop count limit that discards request messages which have a hop count greater than the limit.

The two prong algorithm controls congestion, again through the message forwarding and floodgating heuristic. The relatively even distribution of messages in the algorithm helps to reduce congestion at 'hub' nodes. At the critical Gray Origin and Black Origin nodes, message volume, which is related to the number of paths used in the final restoration solution, is very low. This is because the only Gray messages that travel all the way to the Black Origin node have probably (though not always) traveled over a path that has been connected all the way to the Gray Origin node and can be used as a final solution path. This is a significant factor in the time to restore performance of the algorithm, particularly as network size increases.

In the Self Healing Network algorithm, congestion is not controlled. Signatures are flooded throughout the network and can result in as many signatures arriving at a critical 'Chooser' node as there are spare channels connected to the node. As stated, this algorithm is dependent upon special hardware adaptations to the DCS equipment to process these signatures in a timely manner. Even though the RREACT algorithm uses a heuristic to kill off duplicate messages and messages older than one second, there is still a high volume of messages, particularly at the 'Chooser' node, which must select from all identified paths those which are to be used in the restoration solution. This creates considerable congestion which adversely affects the algorithm's time to restoration performance, particularly in large networks. Because of its message flooding heuristic and multiple waves approach, the FITNESS algorithm has very low congestion, particularly at critical nodes.

Because intermediate nodes must make path connection decisions, without global knowledge of the network's topology, the two prong algorithm is the most sensitive to race conditions of the distributed network restoration algorithms discussed. To counter race conditions, each node keeps a table of all the messages it has seen. A sophisticated logic is required to correctly act upon each message as it arrives. The logic depends upon the message type received, its source, the requested bandwidth, the spare channel capacities of all links connected to the node, and the state of the entries in the message table in the node. An example of a simple race condition problem is provided in FIGS. 10a to 10d.

For the FIG. 10 problem, a single link failure has occurred between Nodes C and F with the loss of 9 channels. Assume Node C becomes the Gray Origin node and Node F the Black Origin node. Both of the Origin nodes begin normal flooding to their neighbors. This flooding is shown in FIGS. 10a and 10b.

At this point, Node D has received a Gray message for 9 channels from Node B and a Black message for 5 channels from Node F. Assume that the Black message arrived first and Node D is therefore a 'Black' node. Node D can now make cross connections between Nodes B and F for 5 channels. Since Node D is a Black node, it cannot flood (broadcast) the Gray message; rather, it can forward it only in response to a Black message. Node D sends a Backtrack Gray message to Node B, and also keeps a record of the Gray message it received from Node B.

Figure 10A:
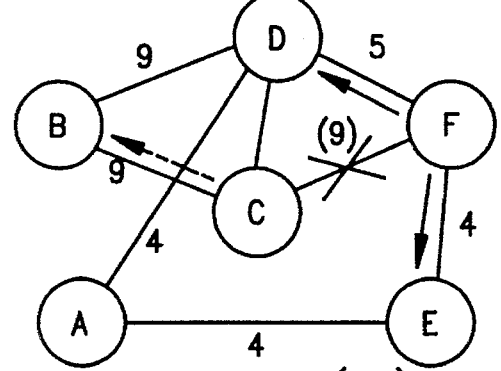
FIGS. 10a–10d are diagrams illustrating a "Race Condition" problem.
Figure 10B:
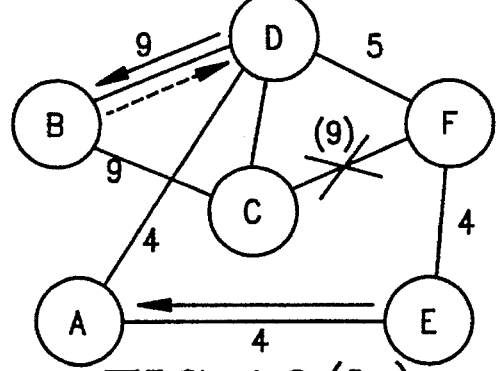
Figure 10C:
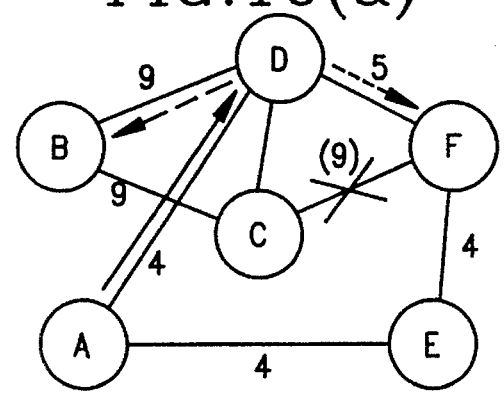

FIG. 10c shows the resulting messages: Gray message for 5 channels from Node D to F, Backtrack Gray message that only 5 channels were connected from Node D to B, and Black message for 4 channels from Node A to D.

Figure 10D:
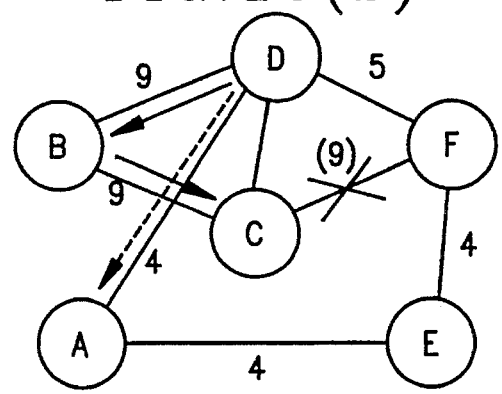

Now Node D can connect the rest of the channels requested from Node B. The resulting messages are shown in FIG. 10d: Black message for 5 channels from Node B to C, Black message for 4 channels from Node D to B, and Gray message for 4 channels from Node D to A.

The Self Healing Network and RREACT algorithms are not adversely affected by race conditions and have no special mechanisms to counter them. In the case of the FITNESS algorithm, its multiple waves are controlled by a time-out mechanism which is sensitive to race conditions. The performance of this algorithm can vary considerably due to network dimension and topology, failure location within the network, and the value selected for the time-out period.

The two prong algorithm is significantly different from the other algorithms in the way in which it connects restored paths. Path connection begins in the two prong algorithm from the moment a node has received both a Gray and a Black message. This means that path connection begins earlier than in the other network restoration algorithms and a high degree of parallelism is generated as multiple paths are connected in parallel and connections along the same path are performed concurrently. Final connections at the disrupted ends are made as each restoration path is identified by both the Gray Origin and Black Origin nodes. Since connections through the intermediate nodes are made even before the path is recognized by the origin nodes, Ack and Confirm messages are transmitted 'in-band', that is directly from one origin node to the other without processing by intermediate nodes. This significantly improves the two prong algorithm's time to restoration performance over other algorithms which initiate path connection only after the path is identified and make connections in a sequential manner.

The Self Healing Network algorithm initiates DCS cross connections once a path has been traced by a signature message from the Sender node to the Chooser node. The connections along this path are then sequentially initiated as an acknowledgment message traverses the path from the Chooser node to the Sender. The FITNESS algorithm is similar to the Self Healing Network algorithm, except that each path thereof is of some aggregate bandwidth, whereas the Self Healing Network algorithm connects individual channels. Similarly, the RREACT algorithm initiates cross connections as each path trace arrives at the Chooser node. It should be noted that in the case of the Self Healing Network and RREACT algorithms, some parallelism is preserved since multiple paths are likely to be in the process of making cross connections. For the FITNESS algorithm, however, only one single path is created at a time, with those cross connections being implemented in a sequential manner.

Figure 11:
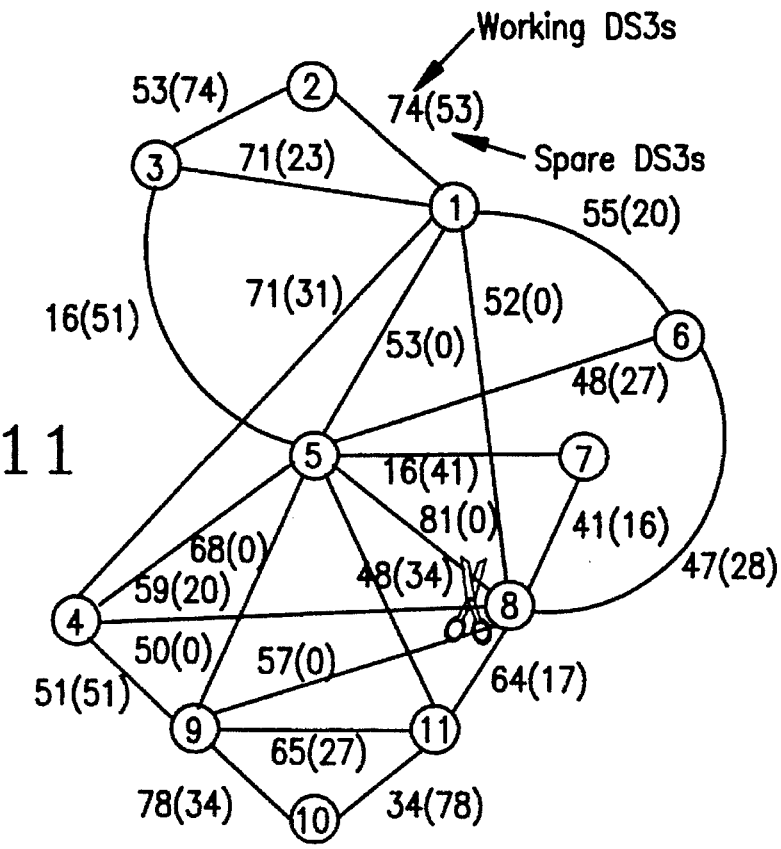
FIG. 11 illustrates a New Jersey LATA network.
Figure 12:
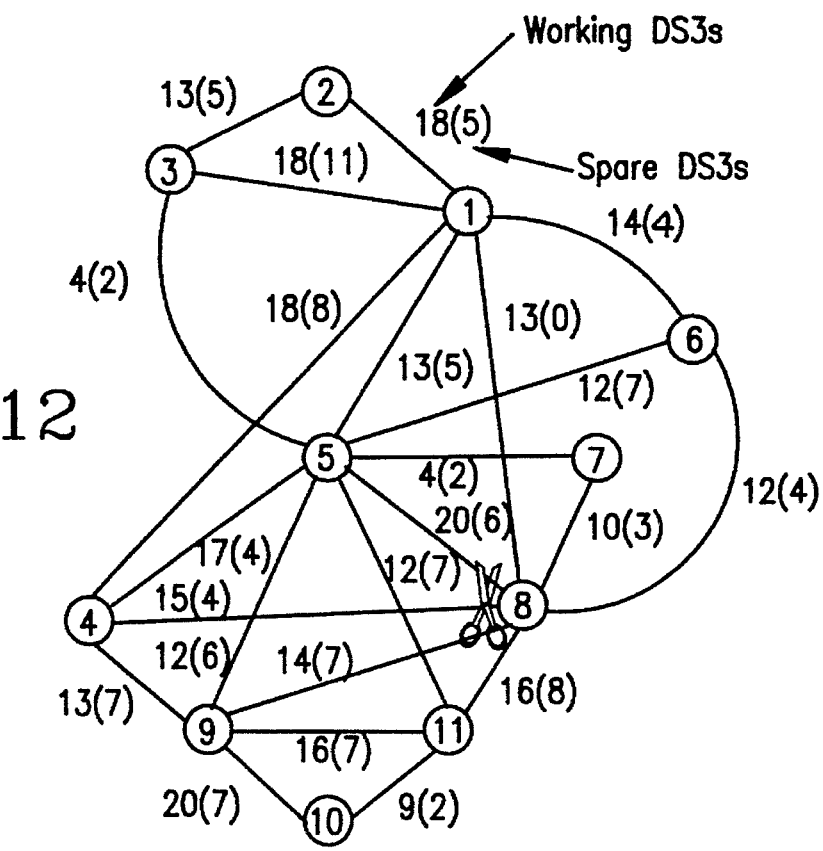
FIG. 12 illustrates a LATA 'X' network.
Figure 13:
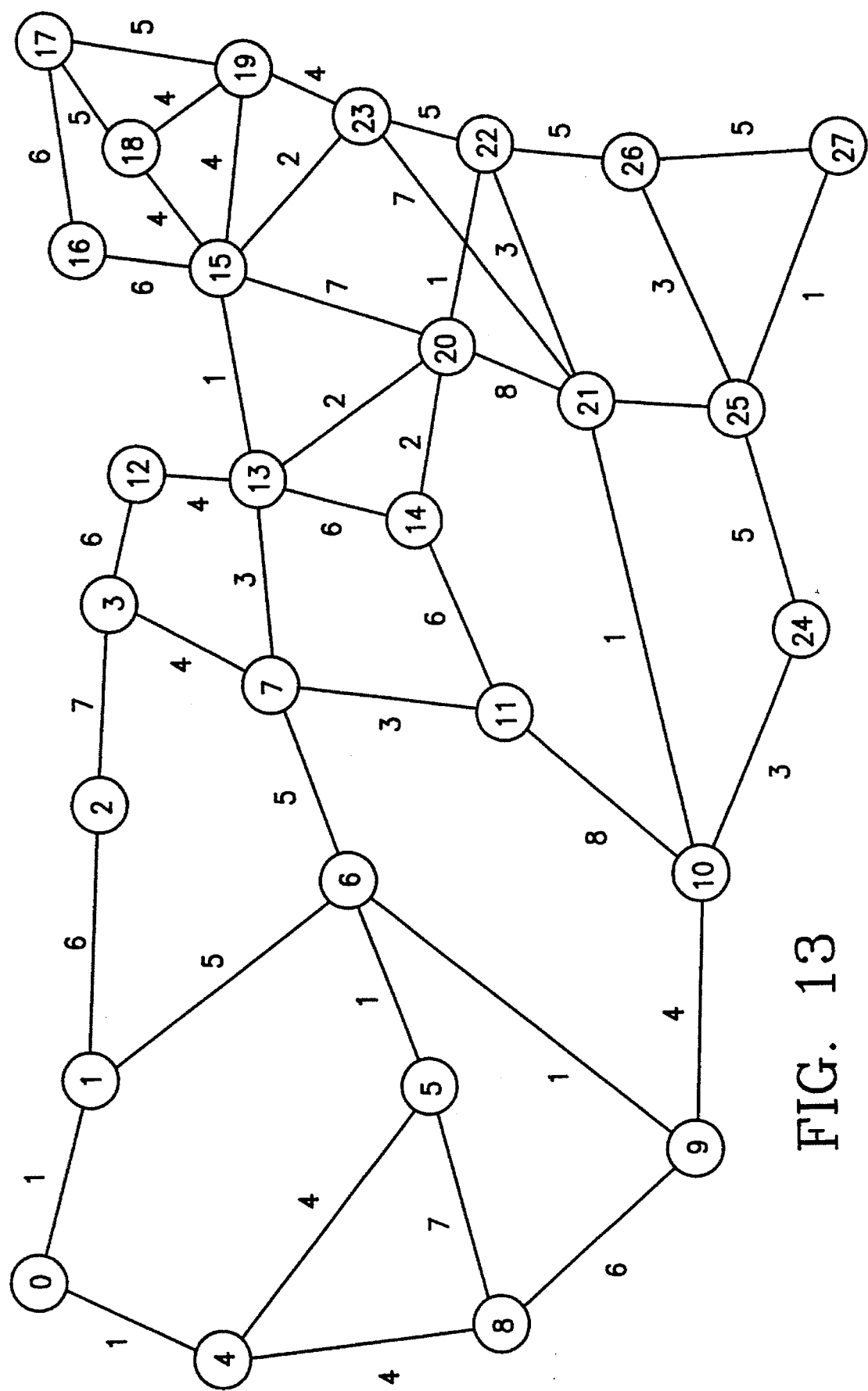
FIG. 13 is a diagram of a 'US Net' LATA network.

The two prong, FITNESS and RREACT algorithms were tested using the NETRESTORE simulator developed at the University of Colorado at Colorado Springs. All algorithms were tested on three networks: the New Jersey LATA test network which was defined in the paper entitled "FITNESS: Failure Immunization Technology for Network Service Survivability" by C. H. Yang and S. Hasegawa, Proc. of GLOBECOM '88, pp. 47.3.1–47.3.6, November 1988, and shown in FIG. 11; the LATA 'X' network defined in the Grover '89 paper noted above and shown in FIG. 12; and the US Net LATA network, also defined in the Grover '89 paper and shown in FIG. 13.

All algorithms were identically tested under the following assumptions:

a. All messages have equal priority
b. All messages are serviced by a node in the order they are received
c. It requires 10 msec to process any incoming messages
d. It requires an additional 10 msec to generate each outgoing message
e. Propagation speed of messages is 200,000 km/sec
f. Transmission delays are computed for variable length messages, using a 8000 bytes per second transfer rate
g. These results do not include the time required for fault detection or cross connection delays
h. All execution runs were terminated after 2 seconds of simulation time The performance statistics included for the Self-Healing Network algorithm are taken from those published in the Grover '89 article.

In general, the two prong algorithm performed better than the other algorithms with respect to the time to restoration performance metric. This is primarily due to the aggressive nature of the algorithm in identifying, selecting and connecting restoration paths. The algorithm's time to restoration performance is also enhanced in that the hand shaking required to make final connection of the disrupted ends of the lost channels is done over connected paths. In smaller networks, the RREACT algorithm is able to compete relatively closely to the two prong algorithm in terms of time to restoration. But as network size increases (as shown by the US Net results), the two prong algorithm is able to clearly outperform REACT in this regard. This is due to a high degree of congestion at the Chooser node in the RREACT algorithm, while the Origin nodes in the two prong algorithm have a much lower level of congestion.

The performance of the two prong algorithm was found to be related to the number of paths used in the final restoration solution. Further analysis indicates that the best possible time to completion of any given path is:

$$T_i = max\ (h_i(2t)+4t+c+3P_i,\ T_{i-1}+t) \quad (1)$$

Where:
$T_i$ is the Time required to complete $path_i$,
h is the hop count of $path_i$,
t is the time required to process a single message,
c is the time required to complete a path's cross connection at a single node, and
$P_i$ is the propagation time required over $path_i$.

Since the best possible time for completion of full restoration is dependent on the number of paths in the final restoration solution, the best time performance of the two prong algorithm is that of the last ($n^{th}$) path to be connected plus the time required for fault diagnosis (f). Equation (1) then becomes:

$$T_n = f + max\ (h_n(2t)+4t+c+3p_n - T_{n-1}+t) \quad (2)$$

The formulas above hold for all networks where $c \leq 2t$. In networks where $c > 2t$, the following best possible time to restoration formula holds $$T_n = f + max\ (h_n(2t)+2t+2c+3p_n,\ T_{n-1}+t) \quad (3)$$

Worst case performance of the two prong algorithm is hard to determine and is quite dependent upon the topology of the network. Work continues towards determining a hard upper bound for the time to restore performance of the algorithm. Generally, of the networks studied so far, it has been found that the two prong algorithm performs within factor of 2 of its best case time performance.

In the tested networks, the two prong algorithm has achieved a satisfactory level of restoration, that is, all that is possible. Successive improvements of the algorithm's ability to counter race conditions has resulted in the current implementation being able to achieve the same level of restoration as the other algorithms.

While the two prong algorithm has comparably economical utilization of spare channel resources, it is sometimes beaten by the RREACT algorithm. This is due to the aggressive commitment of links to possible restoration paths which are not included in the final restoration solution. Because these links are temporarily 'committed' to a restoration path, another candidate path, which could have included them, makes another choice which becomes part of the final restoration solution. Ultimately, the original links are not used and are released, but it is too late to include them in the final solution since they have already been 'bypassed'.

Preliminary analysis indicates that the two prong approach offers implicit benefits over a Sender-Chooser approach in that it is able to automatically distinguish between a single link failure and the node failure scenario. This is quite beneficial in that it reduces the message volume involved in recovery from these failure scenarios and wasted effort as two restoration activities compete for message processing time and spare channel capacity.

The two prong algorithm does have a fairly high message volume. However, the increase in message volume seems linearly related to the number of links in a network and does not demonstrate exponential growth. Further, the message processing is fairly evenly distributed across the network with low congestion at critical nodes so that message volume seems to have minimal impact upon the time to restoration performance of the algorithm.

The FITNESS algorithm has the lowest message volume of all the algorithms studied. The RREACT algorithm has low message volume in small networks, but appears to have an exponential growth as the network size increases. This is due to the exhaustive trace of all paths in the network. Due to the restoration path selection process the RREACT algorithm is based on, congestion is also high at the critical Sender node in these large networks. Published results of the Self-Healing Network algorithm do not report message volume. From analyzing its functional characteristics, however, it can be estimated to be quite high and probably demonstrates exponential growth relative to the number of links in the network.

The tables of FIGS. 15 through 17 show the performances of the four algorithms on the three networks (results for the Self-Healing Network are not available for the New Jersey LATA network). The tables compare their performances in matrices 1, 2, 3 and 5 described above, i.e. time to restoration (in msec), level of restoration, spare channels used and number of messages. Also included are the number of distinct paths each algorithm used in its final solution. Casual comparison of this metric shows that while comparing time performance of an algorithm from one failure scenario to another demonstrates a common correlation between the individual algorithm's time performance and the number of paths involved in the final restoration solution, not much insight is gained as to how the algorithms perform relative to one another.

While a preferred embodiment of the invention has been disclosed for purposes of explanation, numerous changes, modifications, variations, substitutes, and equivalents, in whole or in part, should now be apparent to those skilled in the art to which the invention pertains. Accordingly, it is intended that the invention be limited only by the spirit and scope of the appended claims.

We claim:

1. A method of restoring traffic flow in a communications network after disruption of traffic at at least one of said network's links, comprising the steps of:

locating said one link where said traffic disruption occurred;

designating nodes at respective ends of said one link as origin nodes;

broadcasting respective restoration request messages from said origin nodes to other nodes in said network;

making cross connections between selective ones of said other nodes at which said respective restoration request messages from both origin nodes have been received and whose cross-connected links have adequate spare channel capacity to effect at least one new communication path between said origin nodes.

2. The method of claim 1, wherein said origin nodes are respectively designated as a black origin node and a gray origin node, and wherein said broadcasting step further comprises the step of:

broadcasting black restoration request messages from said black origin node and gray restoration messages from said gray origin node to said other nodes of said network via different cross-connected links thereof to effect a restoration path.

3. The method of claim 2, further comprising the steps of:

designating intermediate nodes in receipt of a black restoration request message as black nodes and intermediate nodes in receipt of a gray restoration request message as gray nodes;

broadcasting black restoration request messages from said intermediate black nodes and gray restoration request messages from said intermediate gray nodes to respective neighbor nodes via corresponding cross-connected links having sufficient spare channel capacity.

4. The method of claim 2, further comprising the steps of:

said black origin node transmitting an acknowledge message to said restoration path upon receipt of a gray restoration request message;

said gray origin node monitoring spare channels in said restoration path for said acknowledge message upon receipt of a black restoration request message; and said gray origin node, upon detection of said acknowledge message, transmitting a confirm message containing mapping information to said black origin node for effecting said new communication path.

5. The method of claim 4, wherein upon establishment of said new communication path, further comprising the step of:

said black origin node transmitting cancel messages to said other nodes to disconnect any cross connections not utilized in said new communication path.

6. The method of claim 1, further comprising the step of:

maintaining a record of all restoration request messages received at each node and whether any of said received messages were broadcasted by said each node to its neighbor nodes over cross-connected links having sufficient channel capacity.

7. The method of claim 4, wherein each of said neighbor nodes having received a restoration request message from said each node but whose link cross-connected to said each node does not have sufficient channel capacity to satisfy the bandwidth required in said restoration request message reports to said each node a backtrack message informing said each node that its requested bandwidth cannot be accommodated;

whereupon said each node terminates its connection to said neighbor node that sent said backtrack message and redirects its restoration request message to a different neighbor node.

8. In a communications network, a method of effecting at least one new communication path to carry traffic disrupted by a break in a link of said network, comprising the steps of:

broadcasting two restore signals, one from each end node of said link, to other nodes of said network;

making cross connections between selective ones of said other nodes at which said restore signals from both end nodes are received and whose cross-connected links have sufficient spare channel capacity to effect said new communication path between said end nodes.

9. The method of claim 8, further comprising the step of:

maintaining a record of all restore signals received at each of said other nodes and whether any of said received signals were further propagated by said each of said other nodes to its neighbor nodes over cross-connected links having sufficient channel capacity.

10. The method of claim 8, wherein said end nodes comprise a first end node for broadcasting a first of said restore signals and a second end node for broadcasting a second of said restore signals;

wherein the first of said other nodes receiving said first restore signal is designated a related first node and the first of said other nodes receiving said second restore signals is designated a related second node, said related first and second nodes further broadcasting corresponding said first and second restore signals to their respective neighbor nodes to designate the same as additional respective related first and second nodes, the propagation of said first and second restore signals among said other nodes being effected via cross-connected links having sufficient spare channel capacity.

11. The method of claim 10, wherein each of said other nodes having received one of said restore signals from its neighbor node but whose cross-connected link to said neighbor node does not have the sufficient channel capacity required in said one restore signal transmits a backtrack signal to said neighbor node to indicate that said cross-connected link does not have the required channel capacity;

whereupon said neighbor node terminates its connection to said backtrack signal transmitting node and redirects its said one restore signal to another one of its adjacent other nodes.

12. The method of claim 10, further comprising the steps of:

said first end node transmitting an acknowledge signal to said new communication path upon receipt of said second restore signal;

said second end node monitoring spare channels in said path for said acknowledge signal upon receipt of said first restore signal;

said second end node, upon detection of said acknowledge signal, transmitting a confirm signal containing mapping information to said first end node; and said first end node, upon establishment of said new communication path, transmitting cancel signals to said other nodes to disconnect any cross connections not utilized in said new communication path.

13. System for restoring service in a communications network after disruption of traffic flow at at least one of said network's links, comprising:

fault detecting means for identifying said one link where said traffic disruption occurred as a faulty link, respective said fault detecting means located in respective end nodes sandwiching said faulty link;

broadcast means located in each of said end nodes for broadcasting respective restoration request messages from said end nodes to other nodes in said network;

cross-connect means in each said other nodes for making cross connections between selective ones of said other nodes at which said respective restoration request messages from both end nodes have been received and whose cross-connected links have adequate spare channel capacity to effect at least one new communication path other than through said faulty link between said end nodes.

14. System of claim 13, wherein said end nodes are respectively designated as a black origin node and a gray origin node, and wherein said broadcast means in said black origin node broadcasts black restoration request messages and said broadcast means in said gray origin node broadcast gray restoration messages to said other nodes of said network.

15. System of claim 14, further comprising:

means in each of said other nodes for recognizing itself as an intermediate black node upon receipt of a black restoration request message and an intermediate gray node upon receipt of a gray restoration request message;

broadcast means located in each said black intermediate node for broadcasting black restoration request messages and each said gray intermediate node gray restoration request messages to their respective neighbor nodes via corresponding cross-connected links having sufficient spare channel capacity.

16. System of claim 14, further comprising:

means located in said black origin node for transmitting an acknowledge message to a restoration path upon receipt of a gray restoration request message;

means located in said gray origin node for monitoring spare channels in said restoration path for said acknowledge message upon receipt of a black restoration request message; and wherein upon detection of said acknowledge message, means located in said gray origin node for transmitting to said black origin node on said restoration path a confirm message containing mapping information for effecting said new communication path.

17. System of claim 16, further comprising:

means located in said black origin node for transmitting cancel messages to said other :nodes to disconnect any cross connections not utilized in said new communication path upon establishment of said new communication path.

18. System of claim 13, further comprising:

storage means located at a central location for maintaining a record of all restoration request messages received at each of said other nodes and whether any of said received messages were broadcasted by said each of said other nodes to its neighbor nodes over cross-connected links having sufficient channel capacity.

19. System of claim 16, wherein each of said neighbor nodes having received a restoration request message from said each of said other nodes but whose link cross-connected to said each of said other nodes does not have sufficient channel capacity to satisfy the bandwidth required in said restoration request message further comprises:

response means for providing to said each of said other nodes a backtrack message informing said each of said other nodes that its requested bandwidth cannot be accommodated;

whereupon means located in said each of said other nodes terminates its connection to said neighbor node that sent said backtrack message and redirects its restoration request message to a different neighbor node.

20. In a communications network, arrangement for effecting at least one new communication path to route traffic disrupted by a break in a link of said network, comprising:

broadcast means located in each end node of said link for broadcasting respective restore signals to other nodes of said network;

cross-connect means in each of said other nodes for making cross connections between selective ones of said other nodes at which said respective restore signals broadcasted by both said end nodes are received and whose cross-connected links have sufficient spare channel capacity to effect said new communication path between said end nodes.

21. Arrangement of claim 20, further comprising:

storage means located at a central location for maintaining a record of all restore signals received at each of said other nodes and whether any of said received signals were further propagated by said each of said other nodes to its neighbor nodes over cross-connected links having sufficient channel capacity.

22. Arrangement of claim 20, wherein said end nodes comprise a first end node for broadcasting a first of said restore signals and a second end node for broadcasting a second of said restore signals;

means for designating the first of said other nodes receiving said first restore signal as a related first node and the first of said other nodes receiving said second restore signals as a related second node;

means located in said related first and second nodes for further broadcasting corresponding said first and second restore signals to their respective neighbor nodes to cause the same to be designated as additional respective related first and second nodes, the propagation of said first and second restore signals among said other nodes being effected via cross-connected links having sufficient spare channel capacity.

23. Arrangement of claim 22, wherein each of said other nodes having received one of said restore signals from its neighbor node but whose cross-connected link to said neighbor node does not have the sufficient channel capacity required in said one restore signal comprises:

means for transmitting a backtrack signal to said neighbor node to indicate that said cross-connected link does not have the required channel capacity;

whereupon means located in said neighbor node terminates its connection to said backtrack signal transmitted node and redirects its said one restore signal to another one of its adjacent other nodes.

24. Arrangement of claim 22, further comprising:

means located in said first end node for transmitting an acknowledge signal to said new communication path upon receipt of said second restore signal;

means located in said second end node for monitoring spare channels in said new communication path for said acknowledge signal upon receipt of said first restore signal;

means located in said second end node for transmitting a confirm signal containing mapping information to said first end node upon detection of said acknowledge signal; and means located in said first end node for transmitting cancel signals to said other nodes to disconnect any cross connections not utilized in said new communication path upon establishment of said new communication path.

* * * * *